United States Patent
Fujita et al.

(10) Patent No.: US 6,459,669 B1
(45) Date of Patent: Oct. 1, 2002

(54) INFORMATION REPRODUCING APPARATUS AND INFORMATION REPRODUCING METHOD

(75) Inventors: Goro Fujita; Kensuke Fujimoto, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/424,439
(22) PCT Filed: Apr. 12, 1999
(86) PCT No.: PCT/JP99/01941
§ 371 (c)(1), (2), (4) Date: Nov. 23, 1999
(87) PCT Pub. No.: WO99/53489
PCT Pub. Date: Oct. 21, 1999

(30) Foreign Application Priority Data

| Apr. 10, 1998 | (JP) | 10-099459 |
| Apr. 23, 1998 | (JP) | 10-113319 |
| May 28, 1998 | (JP) | 10-147531 |

(51) Int. Cl.[7] .................................................. G11B 7/00
(52) U.S. Cl. .................... 369/59.1; 369/59.15; 369/47.1
(58) Field of Search ........................... 369/47.1, 47.25, 369/53.1, 53.44, 59.1, 59.15, 59.17, 59.25, 275.1, 124.01

(56) References Cited

U.S. PATENT DOCUMENTS 5,790,482 A * 8/1998 Saga et al. ........... 369/59.22 X
6,214,519 B1 * 4/2001 Suzuki et al. ........ 369/275.4 X

FOREIGN PATENT DOCUMENTS

| JP | 4-258831 | 9/1992 |
| JP | 11-39739 | 2/1999 |
| WO | 8-63817 | 3/1996 |

* cited by examiner

*Primary Examiner*—Muhammad Edun
(74) *Attorney, Agent, or Firm*—Oblon, Spivak, McClelland, Maier & Neustadt, P.C.

(57) ABSTRACT

Light beams are irradiated from a head 2 onto an optical disc 1 including a recording layer and a reproduction (readout) layer to open, at the reproduction layer, detection window smaller than irradiation range of light beams to thereby read out recording information of the recording layer. A resolution detecting section 15 detects resolution on tile basis of signal level of a reproduction signal reproduced from the optical disc 1. A signal level detecting circuit 11 of the resolution detecting section 15 detects signal level of a specific mark length signal corresponding to specific mark length data in the reproduction signal which has been reproduced, and a resolution calculating circuit 12 calculates resolution on the basis of the detected signal level of specific mark length. A reproduction control circuit 20 controls size of the detection window so that resolution from the resolution detecting section 15 becomes close to reference value K from a reference value output circuit 13 to thereby efficiently carry out aperture correction.

26 Claims, 19 Drawing Sheets

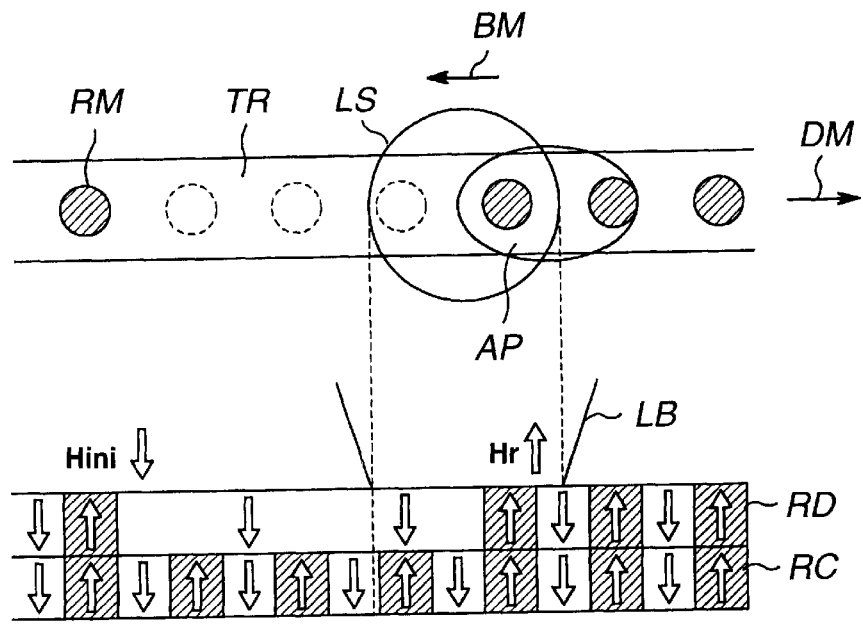
FIG.3A
FIG.3B
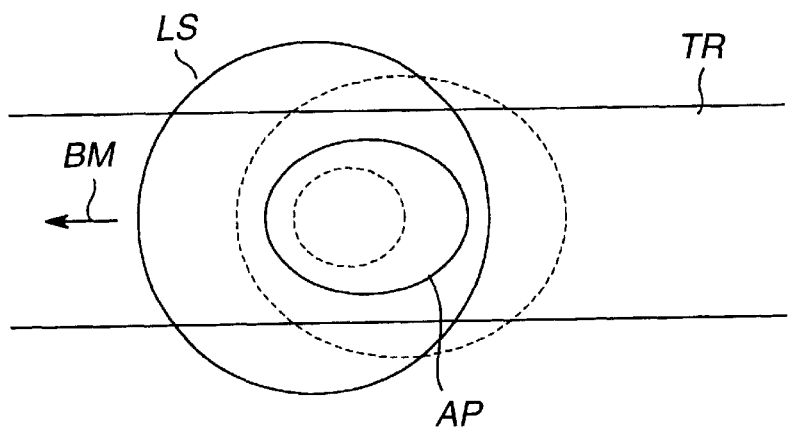
FIG.4

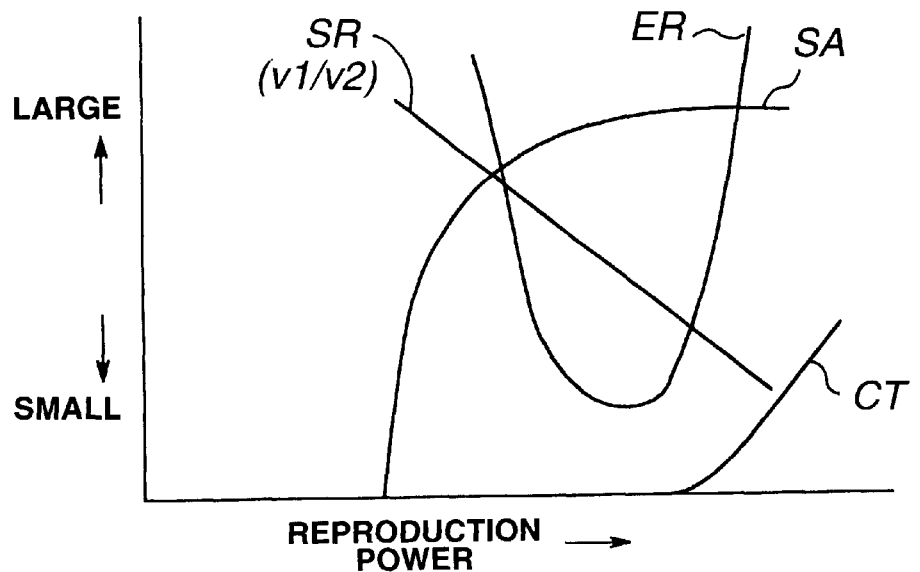
FIG.5
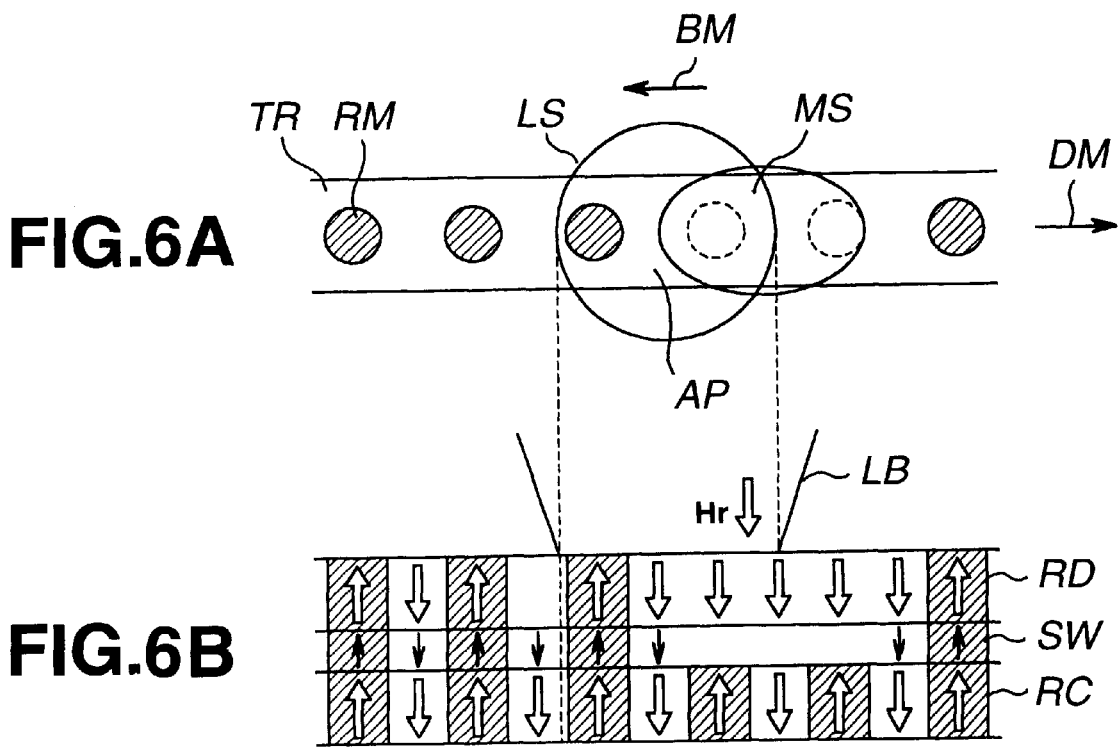
FIG.6A
FIG.6B

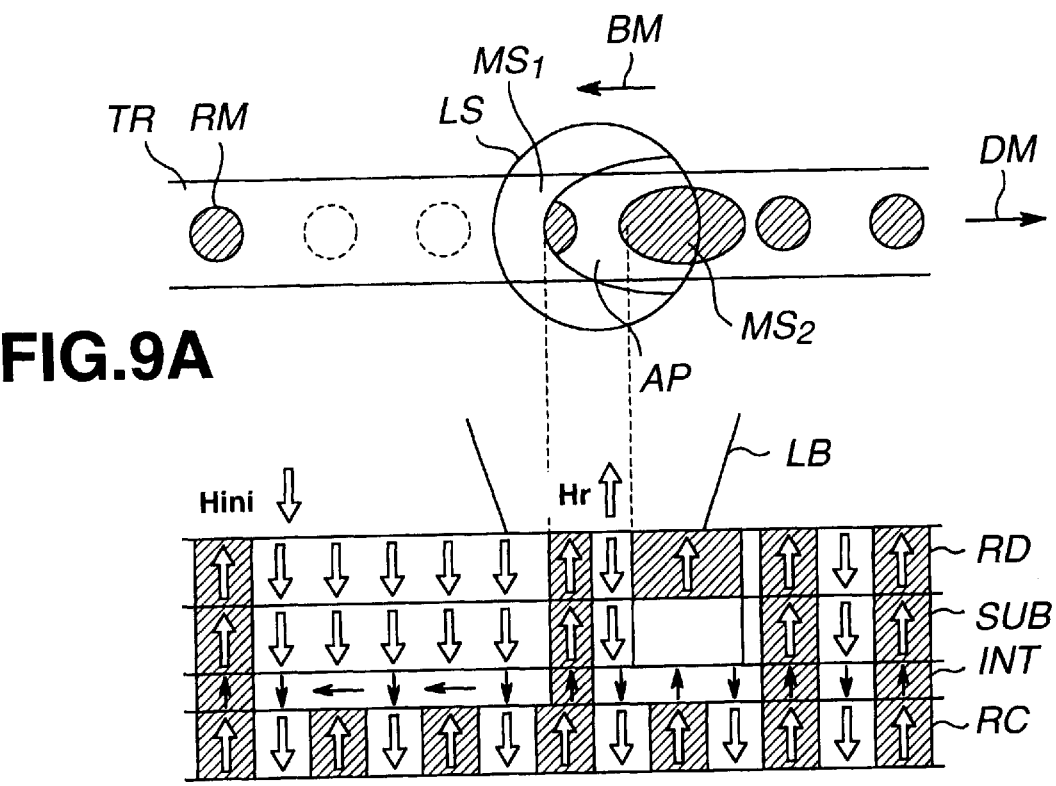
FIG.9A
FIG.9B
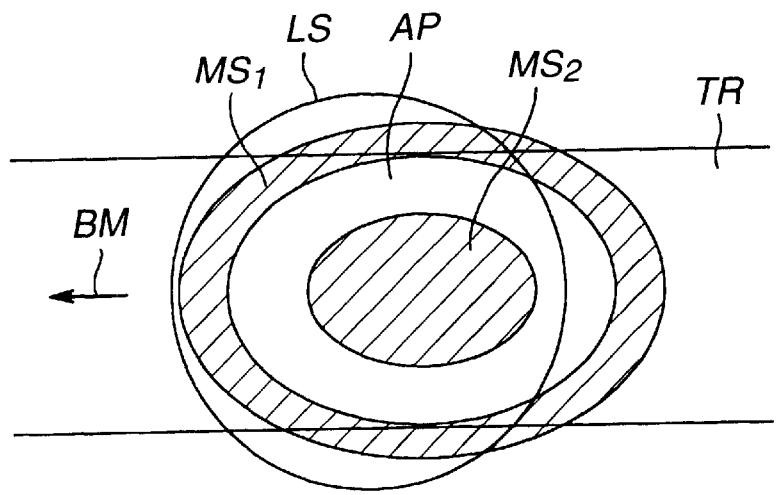
FIG.10

(P1)

(P2)

(P3)

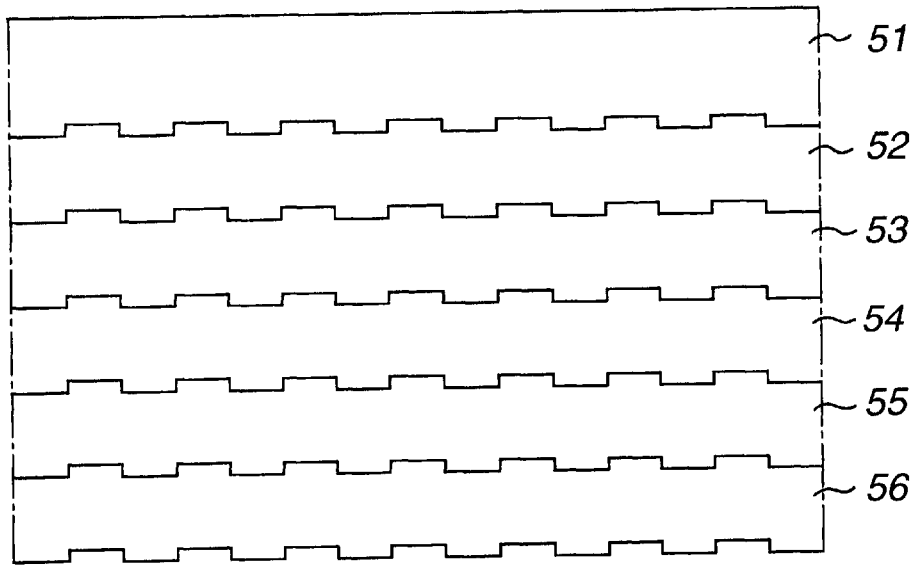
FIG.13
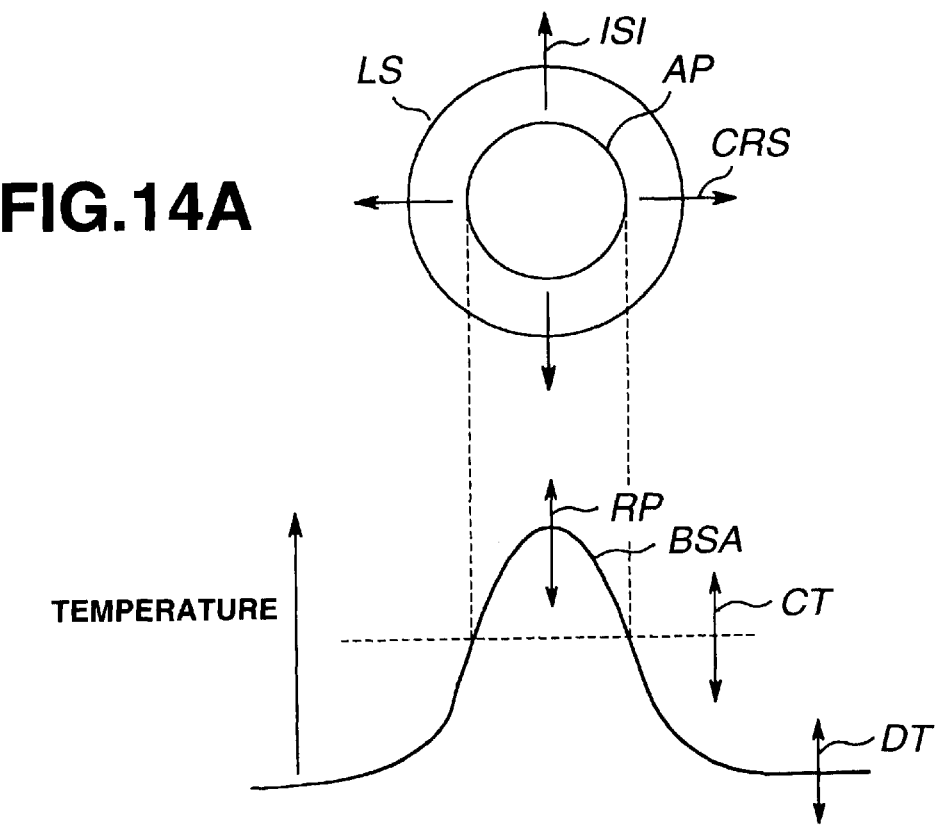
FIG.14A
FIG.14B

2T MARK

4T MARK

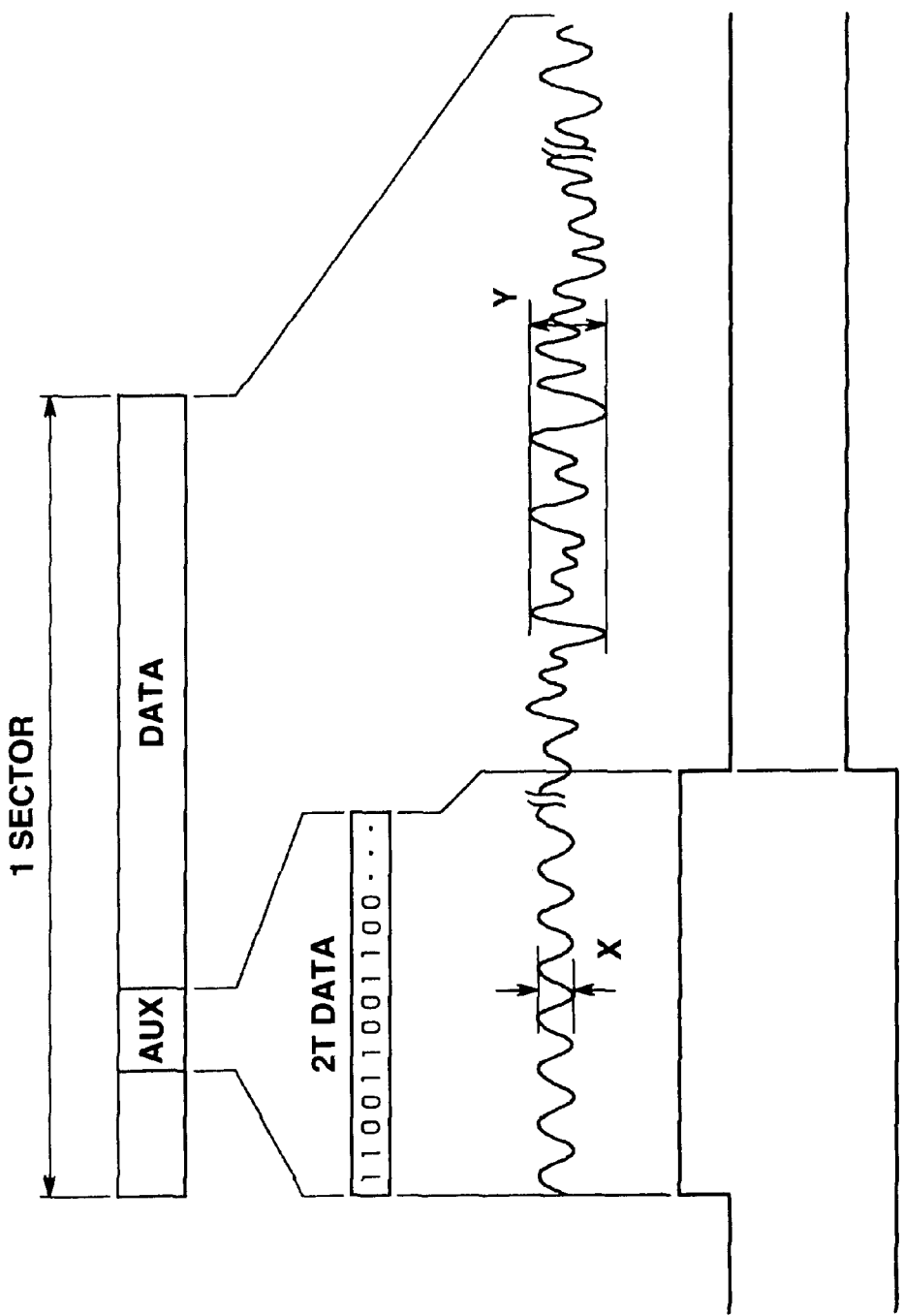

INFORMATION REPRODUCING APPARATUS AND INFORMATION REPRODUCING METHOD

TECHNICAL FIELD

This invention relates to an information reproducing apparatus and an information reproducing method for carrying out reproduction (readout) control of information from medium such as optical disc, etc., and more particularly to an information reproducing apparatus and an information reproducing method for controlling, in an optimum manner, detection window serving as reproduction (readout) area within light beam irradiation range of super resolution optical disc.

BACKGROUND ART

Optical discs are widely utilized, owing to the feature of large capacity thereof, as media for preservation or storage of picture information, musical information or data of computer.

Moreover, in recent years, various technologies have been developed for the purpose of enhancing signal recording density with respect to (onto) recording media such as magneto-optical disc or phase change disc, etc., and attention has been drawn to super resolution reading technology to carry out reproduction (readout) of recording mark smaller than light spot diameter of light beams.

As the super resolution optical disc, there are known MSR (Magnetic Super Resolution) disc, PSR (Phase change Super Resolution) disc, and RSR (ROM Super Resolution) disc, etc. As the reproduction (readout) system, there are known RAD (Rear Aperture Detection) system, FAD (Front Aperture Detection) system, and Double Mask stem, etc. in dependency upon position of reproduction (readout) area of light beam spot. In addition, as one of the RAD system, there is also known CAD (Central Aperture Detection) system.

In this case, e.g., as already disclosed by the applicant of this application in the Japanese Patent Application Laid Open No. 93056/1991 publication and/or the Japanese Patent Application Laid Open No. 93058/1991 publication, etc., MSR of the RAD system is the technology in which recording layer is constituted by multi-layer film including reproduction (readout) layer magnetically coupled thereto and recording retaining layer, whereby, at the time of reproduction, temperature of the reproduction (readout) layer is elevated by irradiation of layer beams so that it falls within a predetermined temperature range to read magnetization signal written in the recording retaining layer only in the area of which temperature has been elevated while transferring it onto the reproduction (readout) layer thus to have ability to reproduce recording mark, smaller than spot diameter of light beams. The area in which the magnetization signal is transferred onto the reproduction (readout) layer so that it can be read is called detection window or aperture.

Moreover, in the MSR of the CAD system, initially, light beams are irradiated from the reproduction (readout) layer side with respect to magneto-optical recording medium provided with recording layer and reproduction (readout) layer having in-plane magnetization. Thus, temperature of the reproduction (readout) layer within the irradiation area is elevated. Further, the state of the reproduction (readout) layer only having detection window (aperture) of which temperature is elevated so as to take predetermined temperature or more within the irradiation area shifts from the in-plane magnetization to vertical (perpendicular) magnetization in which magnetism of corresponding recording layer has been transferred to thereby have ability to carry out reproduction (readout) of recording mark smaller than spot diameter of light beams.

As stated above, in the MSR system, such an approach is employed to read out data written in the recording layer by magneto-optical effect while changing magnetization state of the reproduction (readout) layer thus to obtain super resolution reproduction characteristic.

In reproduction (readout) using such MSR (Magnetic Super Resolution) technology, it is known that reproduction condition such that signal quality becomes optimum is changed by sensitivity or ambient temperature of medium, and/or perturbation such as skew of medium substrate (base), etc.

Meanwhile, in the RAD system, according as reproduction power of light beams becomes larger, the aperture becomes larger, while according as it becomes smaller, the aperture becomes smaller. Accordingly, when the reproduction (readout) power is increased, area of aperture becomes large, and readout area of recording mark recorded in the recording layer at the lower portion of the reproduction (readout) layer becomes large Thus, C/N (ratio of carrier frequency power with respect to noise power) is increased. However, the super resolution characteristic is deteriorated so that recording mark of adjacent track is gradually entered. As a result, crosstalk characteristics based on mixed signal is also deteriorated. On the other hand, when reproduction power is too weak, C/N is reduced.

In the case where reproduction power is too strong as stated above, intercede interference component and crosstalk component by deterioration of super resolution characteristic are increased as previously described. On the other hand, in the case where reproduction power is too weak, C/N is reduced. Thus, in both cases, jitter which is conversion point position error from 1 to 0 or from 0 to 1 in reproducing signal becomes large.

For this reason, in the technology disclosed in, e.g., the Japanese Patent Application Laid Open No. 63817/1996, such an approach is employed to detect amplitudes of reproduction signals of plural recording marks different in length to control reproduction (readout) power so that comparison results between these signal levels are caused to become close to reference value determined in advance, whereby optimum reproduction can be carried out at all times. This means that, e.g., in the case where the ambient temperature is elevated, the reproduction power is reduced to thereby control size of the detection window.

However, in such prior art, since recording marks for detecting resolution are provided on the data area of the optical disc, there is the problem that redundancy becomes large so that recording capacity is reduced accordingly. Moreover, in the case where recording marks for detection of resolution are provided in the state omnipresent in a predetermined area (lead-in area, etc.) of the optical disc, track jump onto the predetermined position is required for the purpose of reproduction power control during reproduction operation, resulting in lowered access characteristic. When recording marks are recorded on the disc in a distributed manner in order to avoid such inconvenience, there is the problem that such a system is not tolerable to defect of the disc.

In addition, there are also instances where sampling cannot be carried out at peak position of signal by reproduction clock used for data demodulation in dependency upon modulation system, whereby amplitude detection of signal fails to be carried out.

DISCLOSURE OF THE INVENTION

This invention has been made in view of the problems as described above and its object is to provide an information reproducing apparatus and an information reproducing method capable of efficiently carrying out aperture change correction without reducing recording capacity and without using dedicated clock for detecting amplitude of reproduction signal of a specific mark length.

Namely, this invention is characterized in that such an approach is employed to detect resolution on the basis of signal level of a reproduction signal reproduced from a recording medium including a recording layer and a reproduction (readout) layer in irradiating light beams with respect to (onto) the recording medium to open, at the reproduction (readout) layer, detection window smaller than irradiation range of light beams to thereby read out recording information of the recording layer, thus to control size of the detection window so that the detected resolution becomes close to target reference value.

In this case, as the reproduction control, it is mentioned to control reproduction (readout) power of light beams irradiated with respect to (onto) the recording medium.

Moreover, as the detection of resolution, it is mentioned to detect signal level of specific Lark length signal corresponding to specific mark length data in reproduction signal reproduced from the recording medium to calculate resolution on the basis of the specific mark length signal.

Further as the detection of resolution, it is mentioned to detect the resolution from signal level distribution of reproduction signal. In more practical sense, such an approach may be employed to carry out statistical processing of signal levels in the vicinity of respective peaks every peaks of signal level distribution to determine respective representative values to determine at least two (2) pairs of signal levels substantially equal to each other in distance with change point of signal of these representative values being put therebetween to detect the resolution on the basis of amplitude ratio which is ratio between respective intervals of these signal level pairs.

Further, as the detection of resolution, such an approach may be employed to detect data pattern from reproduction signal to detect the resolution on the basis of signal level corresponding to the detected pattern.

In addition, such an approach may be employed to divide signal of resolution obtained by the resolution detection into d.c. component, lower frequency component and higher frequency component to control reproduction power by light beams on the basis of the d.c. component and the lower frequency component which are band-divided so that resolution becomes close to the reference value, and to control equalize characteristic of reproduction signal on the basis of the higher frequency component.

Thus, without reducing recording capacity of the recording medium and without necessity to use dedicated clock for detecting amplitude of reproduction signal of specific mark length, aperture change correction can be efficiently carried out.

BRIEF DESCRIPTION OF THE DRAWINGS

FIGS. 3A and 3B are views for explaining the principle of MSR disc of the RAD system.

FIG. 4 is a schematic plan view showing outline of the portion in the vicinity of light spot LS irradiated onto track TR of super resolution disc of the RAD system.

FIG. 5 is a view showing respective characteristics of signal resolution, error rate, signal amplitude and crosstalk with respect to reproduction power in the super resolution disc of the RAD system.

FIGS. 6A and 6B are views for explaining the principle of MSR disc of the FAD system.

FIGS. 9A and 9B are views for explaining the principle of MSR disc of the double mask system.

FIG. 10 is a schematic plan view showing the portion in the vicinity of light spot LS irradiated onto track TR of super resolution disc of the double mask system.

FIG. 13 is a view showing an example of structure of ROM super resolution disc.

FIGS. 14A and 14B are views for explaining parameters which affect detection window (aperture).

FIGS. 16A to 16E are views for explaining the principle of a first embodiment of this invention.

BEST MODE FOR CARRYING OUT THE INVENTION

Embodiments of an information reproducing apparatus according to this invention will be described below with reference to the attached drawings.

Figure 1:
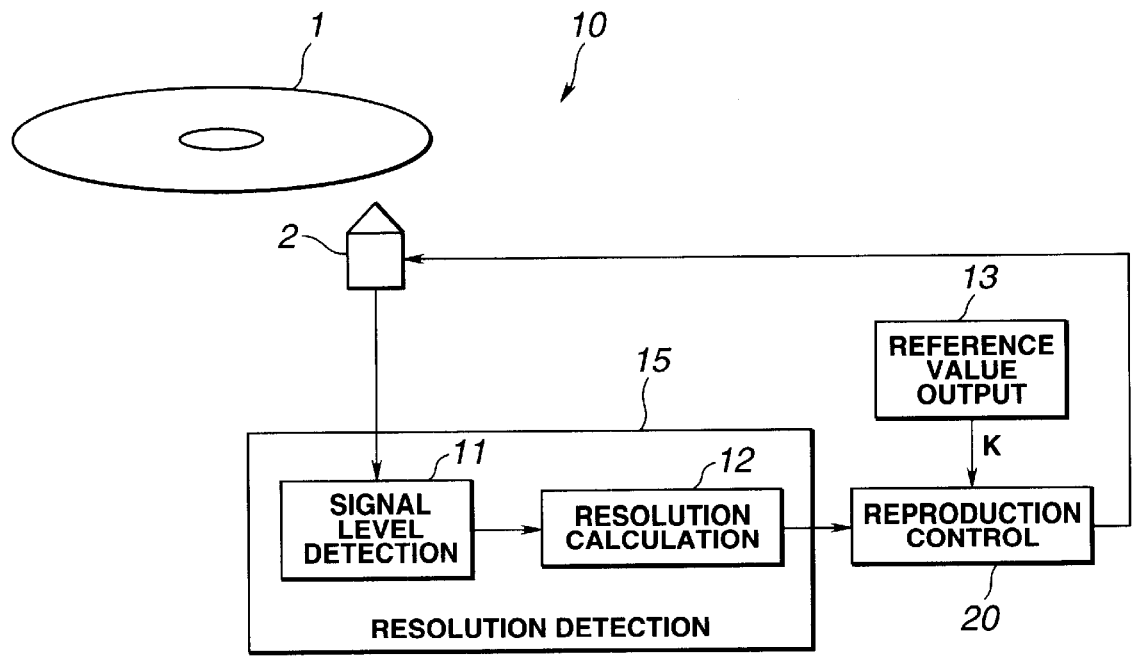
FIG. 1 is a block diagram showing outline of the configuration of a disc reproducing apparatus which is an embodiment of this invention.

FIG. 1 is a block diagram showing outline of the configuration of an optical disc reproducing apparatus as the fundamental embodiment of the information reproducing apparatus according to this invention.

As described later, optical disc reproducing apparatus 10 shown in this FIG. 1 is adapted to irradiate light beams by means of a head 2 with respect to an optical disc 1 which is recording medium including recording layer and reproduction layer to open, at the reproduction (readout) layer, detection window (aperture) smaller than the irradiation range of light beams to thereby read out recording information of the recording layer. In this optical disc reproducing apparatus (unit) 10, resolution is determined by a resolution detecting section 15 on the basis of signal level of reproduction signal reproduced from the optical disc 1 by means of the head 2. Namely the resolution detecting section 15 is composed of a signal level detecting circuit 11 and a resolution calculating circuit 12, and serves to detect signal level of reproduction signal from the optical disc 1 by the signal level detecting circuit 11, whereby the resolution calculating circuit 12 calculates resolution on the basis of the detected signal level to send it to a reproduction control circuit 20. A reference value output circuit 13 outputs reference value K serving as target value of control of resolution, and the reproduction control circuit 20 carries out such a reproduction power control to control power of reproduction light beams of the head 2 in the direction where resolution from the resolution detecting section 15 becomes close to the reference value K.

Figure 2:
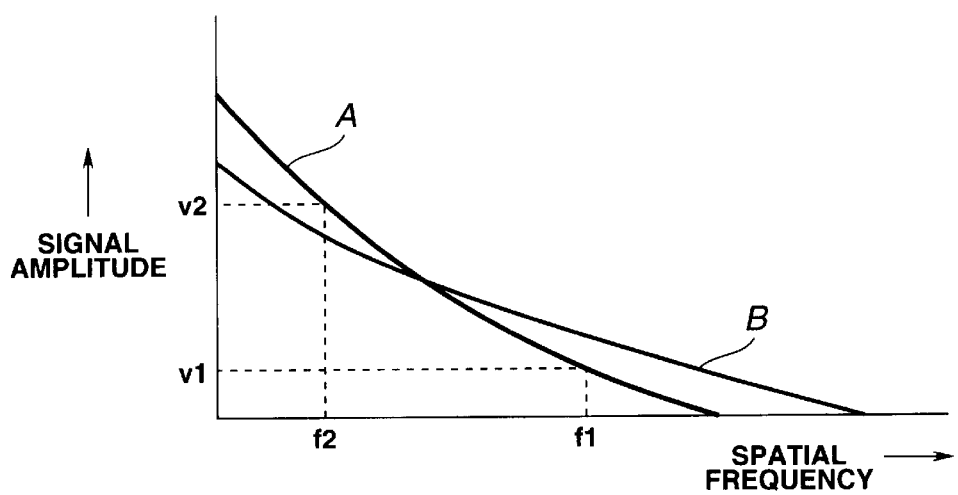
FIG. 2 is a view showing the relationship between spatial frequency and signal amplitude.

In this case, FIG. 2 shows the relationship between spatial frequency and signal amplitude by characteristic curve A in the case of disc of ordinary resolution and characteristic Curve B in the case of disc of super resolution (super resolution disc) as described above. In this FIG. 2, when signal amplitudes with respect to two spatial frequencies f1, f2 (f1<f2) different from each other are assumed to be respectively v1, v2, v1/v2 is value corresponding to signal resolution. According as v1/v2 becomes larger, resolution becomes higher. Detection of resolution is carried out by detecting, e.g., ratio v1/v2 between signal amplitudes or signal levels of (with respect to) such two spatial frequencies f1, f2, i.e., two mark lengths different from each other.

The relationship between reproduction power and resolution in the super resolution disc will now be described. Naively, while various systems are known as super resolution disc, explanation will be given in connection with the fact that it is necessary to control reproduction power for the purpose of optimizing aperture which is reproduction detection window even if either system is employed.

FIGS. 3A, 3B are views for explaining the principle of MSR disc of the RAD system, wherein FIG. 3A is a schematic plan view and FIG. 3B is a schematic cross sectional view. In these FIGS. 3A and 3B, disc medium includes switched connection two (2) layer film composed of recording layer RC and readout (reproduction) layer RD. When laser beams LB are irradiated onto the disc medium moving in the direction indicated by arrow DM by disc rotation, area having highest temperature is formed at the position slightly backward relative to the center of light spot LS because of difference between speed of relative movement in the direction indicated by arrow BM of laser beams LB and thermal diffusion speed of the medium. This area having high temperature serves as detection window (aperture) AP, i.e., reproduction (readout) area, and the area having low temperature at the front of beams serves as mask. In the RAD system, reproduction magnetic field $H_r$ from the external and initial magnetic field $H_{ini}$ are required. By applying the initial magnetic field $H_{ini}$ prior to light spot LS along recording track TR, the reproduction (readout) layer RD is initialized before reproduction. When the initialized portion of this reproduction (readout) layer RD is entered into the light spot LS, recording bits (magnetization in upper direction in the figure) of the recording layer RC are transferred onto the reproduction (readout) layer RD by the reproduction magnetic field $H_r$ from the external in the area of detection window (aperture) AP having high temperature, whereby reproduction is carried out.

FIG. 4 is a schematic plan view showing the portion in the vicinity of light spot LS irradiated oto track TR of the super resolution disc of the RAD system, wherein the above-described aperture (detection window) AP is changed in a manner indicated by dotted (broken) lines in the figure in accordance with reproduction power. Namely, according as reproduction power becomes smaller, the aperture AP becomes smaller, and according as reproduction power becomes larger, the aperture AP becomes larger.

FIG. 5 is a view showing respective characteristics of signal resolution SR, error rate ER, signal amplitude SA and crosstalk CT with respect to reproduction (readout) power.

In this FIG. 5, when reproduction power is above a predetermined value, signal amplitude SA becomes larger and sufficient C/N (carrier/noise ratio) can be obtained. With increase of the reproduction power, error rate ER is lowered. Since aperture becomes large, with increase of reproduction power in the case of the RAD system, signal resolution SR is lowered to more degree according as the reproduction power is increased. When the reproduction power is further increased, size of aperture becomes close: to size of light beam spot. As a result, resolution is further lowered so that super resolution characteristic is lost. Thus, crosstalk CT from adjacent track or tracks is increased and error rate ER is increased. Accordingly, in the case of super resolution disc of the RAD system, signal resolution SR has the relationship inversely proportional to reproduction power. In addition, there exists reproduction power in which error rate ER is minimum. Signal resolution corresponding to reproduction power at this time results in the above-mentioned reference value K as target value of reproduction power control.

Now, FIGS. 6A and 6B are views for explaining the principle of the MSR disc of the FAD system, wherein FIG. 6A is a schematic plan view and FIG. 6B is a schematic cross sectional view. In these FIGS. 6A and 6B, when laser beams LB are irradiated onto disc medium moving in the direction indicated by arrow DM by disc rotation, because of difference between speed of relative movement in the direction indicated by arrow BM of laser beams LB and thermal diffusion speed of the medium, the area the area having highest temperature is formed at the position slightly backward relative to the center of light spot LS. This high temperature area serves as mask area MS. The area having low temperature at the front of beams serves as detection window (aperture) AP, as the reproduction (readout) area. Since the mask area MS has elliptical shape, the detection window (aperture) AP takes crescent shape.

This super resolution optical disc medium of the FAD system is caused to be of configuration including switched connection three (3) layer film composed of recording layer RC, switching layer SW and readout (reproduction) layer RD. In the FAD system, such an approach is employed to apply reproduction (readout) magnetic field $H_r$ from the external at the time of reproduction (readout) to allow directions of magnetization of high temperature area at the back of light beams to be aligned in one direction to make (form) mask area MS to reproduce (read out) recording bits of detection window AP of low temperature at the front of beams.

Figure 7:
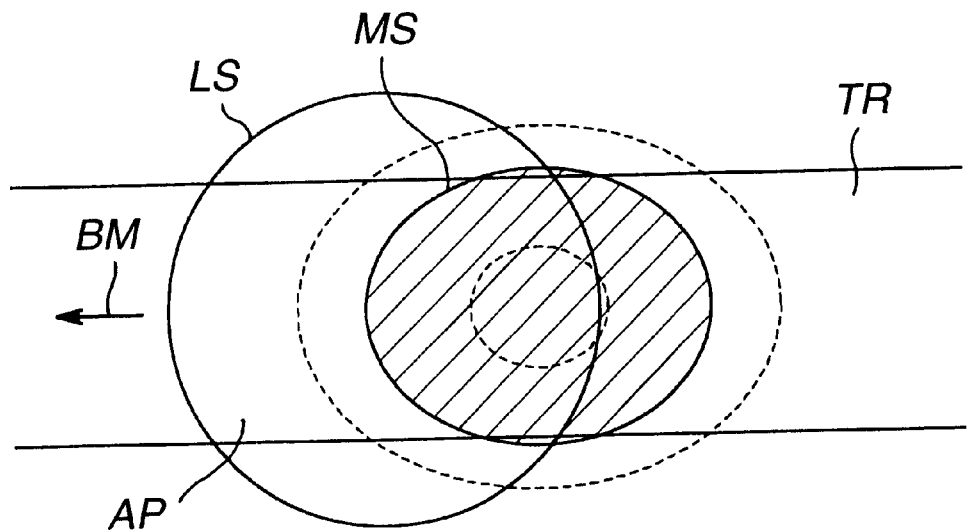
FIG. 7 is a schematic plan view showing the portion in the vicinity of light spot LS irradiated onto track TR of super resolution disc of the FAD system.

FIG. 7 is a schematic plan view showing the portion in the vicinity of light spot LS irradiated onto track TR of super resolution disc of the FAD system, wherein the above-described mask area MS changes as indicated by dotted (broken) lines in the figure in accordance with reproduction (readout) power. Namely, according as reproduction power becomes smaller, the mask area MS becomes smaller, and according as reproduction power becomes larger, the mask area MS becomes larger.

Figure 8:
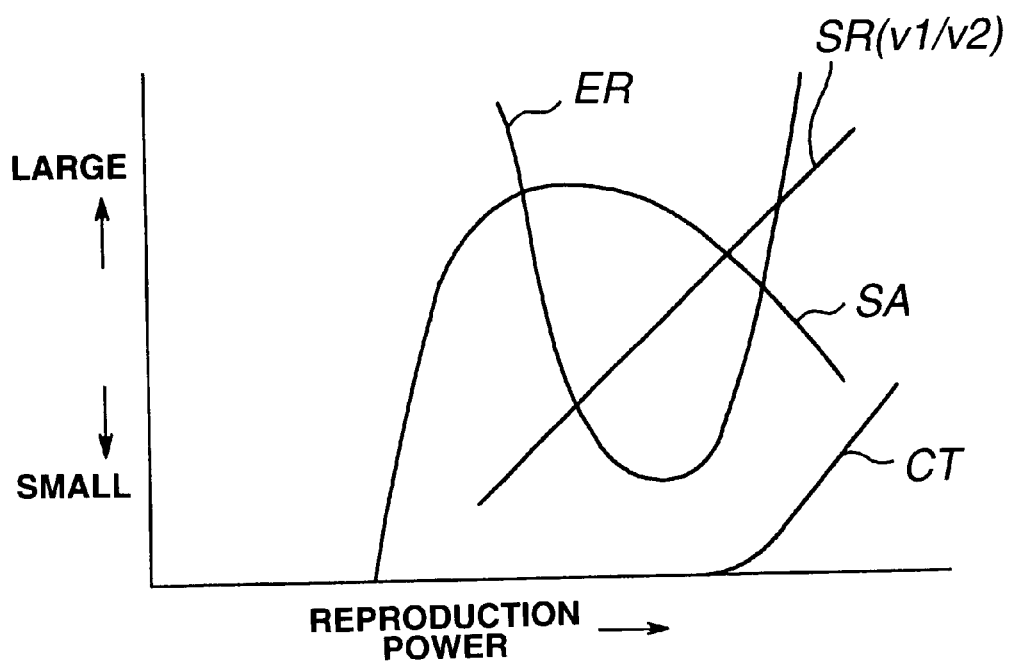
FIG. 8 is a view showing respective characteristics of signal resolution, error rate, signal amplitude and crosstalk with respect to reproduction power in super resolution disc of the FAD system.

FIG. 8 is a view showing respective characteristics of signal resolution SR, error rate ER, signal amplitude SA and crosstalk CT with respect to reproduction power.

In this FIG. 8, when reproduction (readout) power is above a predetermined value, signal amplitude SA becomes large, so sufficient CN (carrier/noise ratio) can be obtained. In accordance with increase of reproduction (readout) power, error rate ER is lowered. With respect to the signal resolution SR, in the case of the FAD system, the mask area MS becomes larger in accordance with increase of reproduction power and the detection window (aperture) AP becomes small. For this reason, according as reproduction power is increased, the signal resolution SR is caused to be high. It is to be noted that when reproduction (readout) power is further increased, crosstalk CT is (increased, and the area within the light spot is caused to be ultimately and entirely mask area so that reproduction cannot be carried out. According as the reproduction (readout) power becomes large from the state where it is small, the error rate ER is lowered, but is minimum at a certain (predetermined) reproduction power. When the reproduction (readout) power further becomes large, the error rate ER is increased. The signal resolution corresponding to reproduction power in which this error rate ER is caused to be minimum is the above-mentioned reference value K as target value of reproduction power control.

Now, FIGS. 9A and 9B are views for explaining the principle of the MSR disc of the double mask system, wherein FIG. 9A is a schematic plan view and FIG. 9B is a schematic cross sectional view. This double mask system is the system where the RAD system and the FAD system are mixed.

In these FIGS. 9A and 9B, when laser beams LB are irradiated onto disc medium moving in the direction indicated by arrow DM by disc rotation, high temperature area is formed at the position slightly backward relative to the center of light spot LS because of difference between speed of relative movement in the direction indicated by arrow BW of laser beams LB and thermal diffusion speed of the medium. At this time, not only the area having low temperature at the front side of beams serves as first mask area $MS_1$, but also second mask area $MS_2$ is formed within the high temperature area. The area put between these two mask areas MS, $MS_2$ serves as detection window (aperture) AP as reproduction area.

This super resolution optical disc medium of the double mask system is caused to be of configuration including switched connection four (4) layer film composed of recording layer RC, intermediate layer INT, subsidiary layer SUB and readout layer (reproduction layer) RD. In the double mask system, reproduction (readout) magnetic field $H_r$ from the external and initial magnetic field $H_{ini}$ are used to apply initial magnetic field $H_{ini}$ prior to light spot LS along recording track TR to thereby initialize reproduction (readout) layer RD before reproduction (readout). When the initialized portion of this reproduction (readout) layer RD is entered into light spot LS, recording bits (magnetization in the upper direction of the figure) of the recording layer RC are transferred, within the area of the detection window (aperture) AP, onto the reproduction (readout) layer RD by reproduction magnetic field $H_r$ from the external so that reproduction (readout) is carried out.

Figure 11A:
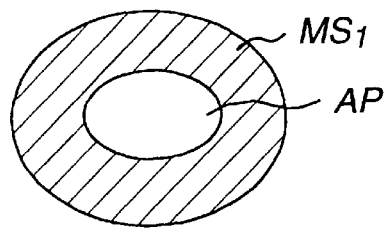
FIGS. 11A, 11B and 11C are views showing change of mask and aperture with respect to change of reproduction power in MSR disc of the double mask system.
Figure 11B:
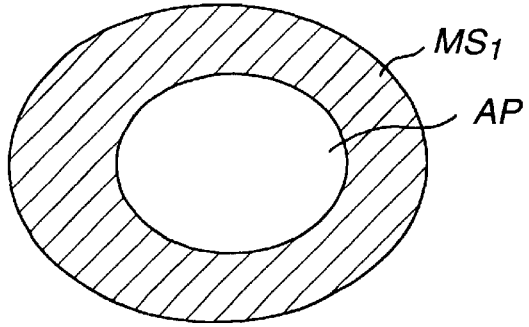
Figure 11C:
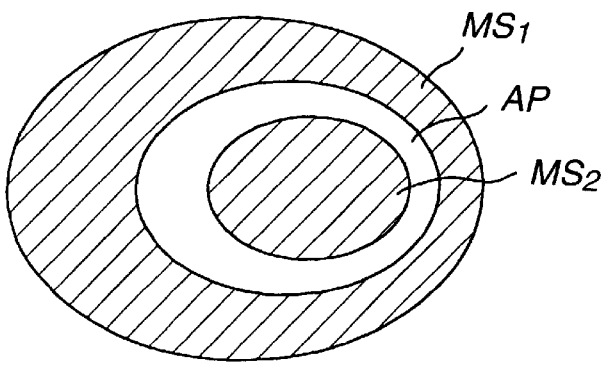

FIG. 10 is a schematic plan view showing the relationship between first and second mask areas $MS_1$, $MS_2$ and detection window (aperture) AP with respect to light spot LS at a certain (predetermined) reproduction (readout) power, and the relationship between these respective areas changes as indicated by FIGS. 11A to 11C in accordance with change of reproduction (readout) power. Namely, there is shown in FIG. 11B the state where reproduction (readout) power is increased from the state of FIG. 11A where reproduction power takes small value P1, and reproduction (readout) power takes value P2 immediately before double mask results. Further, reproduction power is increased so as to take value P3, resulting in the double mask state as shown in FIG. 11C.

Figure 12:
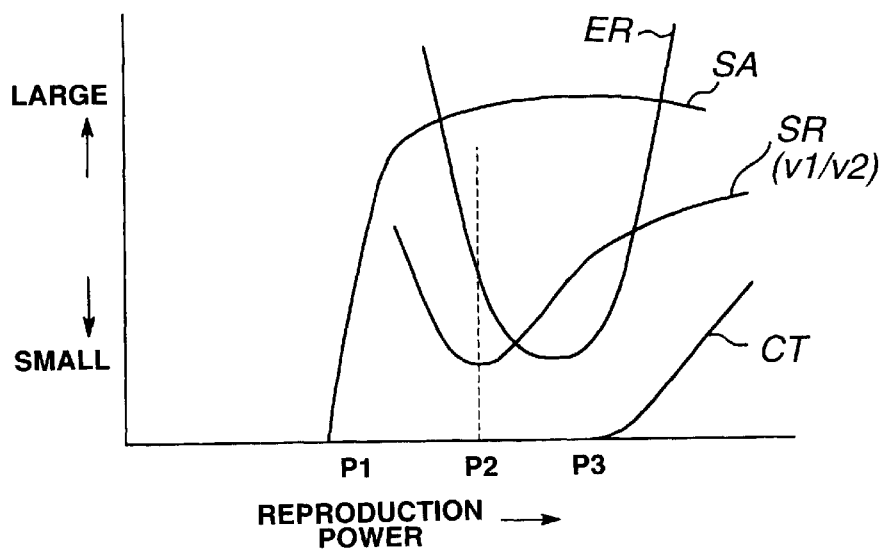
FIG. 12 is a view showing respective characteristics of signal resolution, error rate, signal amplitude and crosstalk with respect to reproduction power in the super resolution disc of the double mask system.

FIG. 12 shows respective characteristics of signal resolution SR, error rate ER, signal amplitude SA and crosstalk CT with respect to reproduction (readout) power. In this FIG. 121, for a time period during which reproduction (readout) power is small, only first mask area $MS_1$ takes place. The signal resolution SR is lowered with increase of reproduction power similarly to the RAD system. However, when reproduction (readout) power is increased so that second mask area $MS_2$ takes place, according as the reproduction (readout) power is increased, the signal resolution SR is increased as in the FAD system. Moreover, the error rate ER is lowered in accordance with the fact that reproduction power becomes larger from the state where it is small, and is continued to be lowered even when the reproduction power exceeds the reproduction (readout) power P2. However, the error rate becomes minimum at a certain (predetermined) power in the double mask state. When the reproduction (readout) power is further increased, the error rate ER is increased. Signal resolution corresponding to reproduction power where this error rate ER is minimum is caused to be the above-mentioned reference value K as target value of reproduction power control.

As the above-explained super resolution recording medium, magneto-optical disc is mainly taken. Also except for MSR (Magnetic Super Resolution) disc, Phase change Super Resolution (PSR) disc and ROM Super Resolution (RSR) disc, etc. are similarly employed. In addition, this invention may be applied to recording medium except for disc.

For example, FIG. 13 shows an example of ROM Super Resolution (RSR) disc. The disc medium shown in FIG. 13 is caused to be of configuration in which a protective layer 52, a $Ge_2Sb_2Te_5$ layer 53, a protective layer 54, a reflection layer 55 and a protective layer 56 are stacked in order from a substrate (base) 51, wherein super resolution reproduction (readout) can be carried out by mask of high temperature portion similar to the above-described FAD. Namely, in chalcogenide film such as $Ge_2Sb_2Te_5$ layer 53, the portion of which temperature is caused to be high by light spot of the laser beams is fused so that refractive index is changed, resulting in mask which absorbs light. In the case of the ROM super resolution disc, the area within the light spot except for the mask portion of the $Ge_2Sb_2Te_5$ layer 53 serves as detection window (aperture), thus making it possible to read recording information of the reflection layer 55 through this detection window. In the case of Phase change Super Resolution (PSR) disc, other structures are similar to those of FIG. 13 except that recording layer is provided in place of reflection layer 55. Since respective characteristics of signal resolution, error rate, signal amplitude and crosstalk with respect to reproduction power are similar to those of FIG. 8, illustration is not made and their explanation will be omitted.

As described above, as the result of the fact that aperture, size of mask and position thereof are changed by reproduction (readout) power, signal amplitude, crosstalk and spatial frequency characteristic which are reproduction characteristics are changed. For this reason, the range optimum for data detection is considerably narrowed.

FIGS. 14A, 14B are views for explaining parameters which affect aperture (detection window), wherein FIG. 14A is a schematic plan view in the vicinity of irradiation position of light spot LS on the recording medium and FIG. 14B is a view showing temperature distribution. As shown in these FIGS. 14A, 14B, temperature distribution curve changes in the direction indicated by arrow in the figure by change of reproduction (readout) power RP, so the aperture AP changes. In addition to setting of this reproduction power RP, the aperture AP is changed by transfer temperature CT from recording layer to reproduction (readout) layer and medium temperature DT as sensitivity of the recording medium. Moreover, the aperture AP is changed also by distortion of beams BSR resulting from tilt or defocus, etc. In order to optimize these parameters (phenomena), there is conceivable a method of detecting characteristic value indicating frequency characteristic of signal which correlates with aperture size, e.g., resolution to optimize it. This similarly applies to super resolution discs of all the systems in addition to the magneto-optical disc.

In this case, the fact that the resolution is controlled so that it takes, e.g., optimum point in data detection corresponds to optimizing (optimization) of aperture. In more practical sense, such an approach is employed to determine resolution when jitter becomes minimum or error rate becomes minimum at the time of detection of data to allow resolution at this time to be reference value or target value to control reproduction (readout) power so that the detected resolution becomes equal to reference value or target value, whereby optimizing (optimization) of aperture can be realized.

Figure 15A:
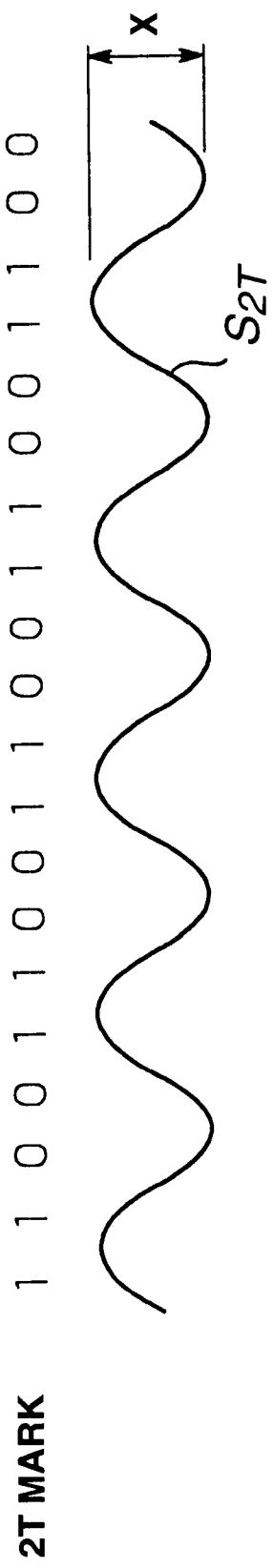
FIGS. 15A and 15B are views respectively showing an example of reproduction signals of 2T mark length pattern and 4T mark length pattern.
Figure 15B:
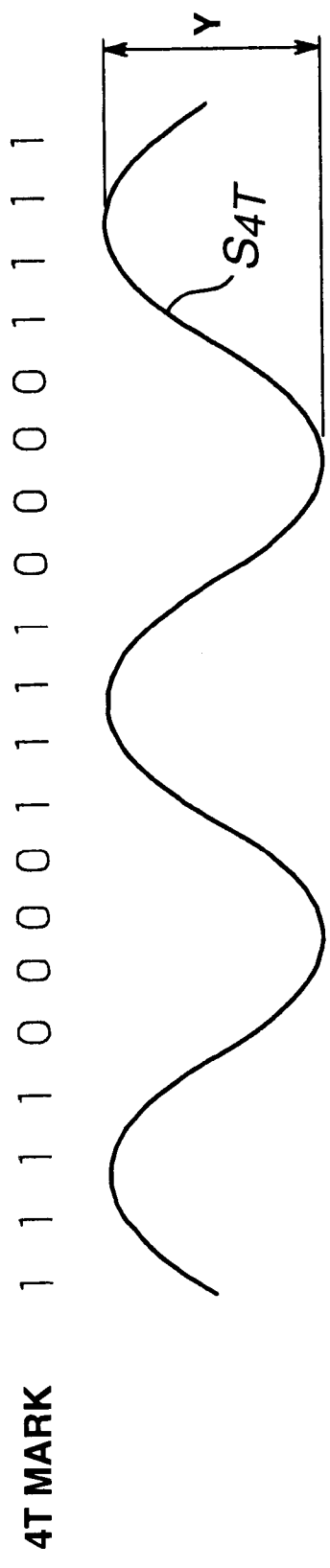

Meanwhile, in the previously described technology disclosed in the Japanese Patent Application Laid Open No. 63817/1996, such an approach is employed to detect reproduction signal levels of plural recording marks of which lengths are different from each other to control reproduction (readout) power so that comparison results between these signal levels are caused to become close to reference value determined in advance, whereby best reproduction can be carried out at all times. For example, when unit time of channel bits of signal (channel bit clock period) is assumed to be T, amplitude X of reproduction signal of data of which mark length is 2T, which is shown in FIG. 15A, and amplitude Y of reproduction signal of data of which mark length is 4T which is shown in FIG. 15B, are respectively detected to determine ratio X/Y between these amplitudes to control reproduction (readout) power so that this amplitude ratio X/Y is caused to become close to a predetermined reference value. In this example, 2T mark length signal $S_{2T}$ of FIG. 15A is signal obtained by reproducing data of pattern in which "00" and "11" are alternately repeated in the NRZ form, and 4T mark length signal $S_{4T}$ of FIG. 15B is signal obtained by reproducing data of pattern in which "0000" and "1111" are alternately repeated in the NRZ form.

In the technology for detecting such signals of which mark lengths are different from each other, there are instances where peak of reproduction signal may appear at the position different from clock position of data detection in dependency upon the modulation system or the demodulation system. When attempt is made to carry out peak detection, other signal processing such as processing which requires clock different from the clock for data detection, etc. As a result, the hardware configuration becomes complicated or burden on signal processing is increased. Moreover, there exist patterns which do not appear in data in dependency upon data modulation system. For example, in the case where pattern which does not appear in data is the pattern of mark length to be detected like the above-mentioned 2T or 4T as in the case of 2–7 NRZ modulation system, it is necessary to record data in the specific area separately or independently provided with pattern which does not exist in data, resulting in increased redundancy with respect to data. Further, since there is necessity of providing, in a distributed manner, on the disc, recording areas of specific repetitive patterns like the above-mentioned 2T or 4T pattern, processing in the case where medium defects concentrate on such area is difficult.

In consideration of points as described above, in the embodiment of this invention, such an approach is employed to detect resolution on the basis of signal level of reproduction signal. In more practical sense, there are roughly three methods. As the first method, a procedure is taken to record in advance one specific mark length (e.g., 2T) in the first area (e.g., AUX area) on the disc to determine amplitude of reproduction signal obtained by reproducing specific mark length data (amplitude of data sample of reproduction signal) X, and to determine amplitude Y from envelope of the reproduction signal of the second area except for the first area to allow the ratio X/Y between these amplitudes to be resolution. Moreover, as the second method, a procedure is taken to carry out statistical processing of signal levels in the vicinity of respective peaks every the peaks of signal level distribution of reproduction signal to determine respective representative values (e.g., take respective mean or average values) to determine at least two pairs of signal levels substantially equal to each other in distance with change point of signal of these representative values being put therebetween t detect the resolution on the ba sis of amplitude ratio d,Y which is ratio between respective intervals X, Y of these signal level pairs. In addition, as the third method, a procedure is taken to detect data pattern from reproduction signal to detect the resolution o n the basis of ratio X/Y between level difference X between data samples before and after zero cross point of signal and amplitude Y of signal envelope in accordance with the detected pattern.

Also in the case where any one of all the methods is employed, resolution when the detection window (aperture)

is optimized is caused to be reference value (or target value) K to control power (reproduction power) of laser light emitting element so that the resolution detected during reproduction operation (the above-mentioned amplitude ratio X/Y) becomes close to the reference value K.

As reference value K of resolution corresponding to the state where the detection window is optimum, it is mentioned to read out information of reference value K written in advance in a predetermined area (e.g., control track, etc.) of the optical disc to use it. Moreover, such an approach may be employed to carry out trial reproduction, while changing reproduction power, in a predetermined trial write area (test track, etc.) of the disc at the tune of disc loading of the optical disc or regularly every suitable time intervals to measure jitter or error rate from reproduction data to determine the point where jitter or error rate is minimum to set amplitude ratio X/Y at this time as the reference value K. Alternatively, such an approach may be employed to Harry out trial reproduction while changing reproduction power to detenmine respective dispersions or variances of signal levels in the vicinity of respective peaks every the peaks of distribution of signal levels of the reproduction signal to set amplitude ratio X/Y when sum total value of these dispersions is minimum as the reference value K.

Explanation will be given in detail below with reference to the attached drawings in connection with first to third embodiments of this invention to which these first to third methods are applied.

Figure 17:
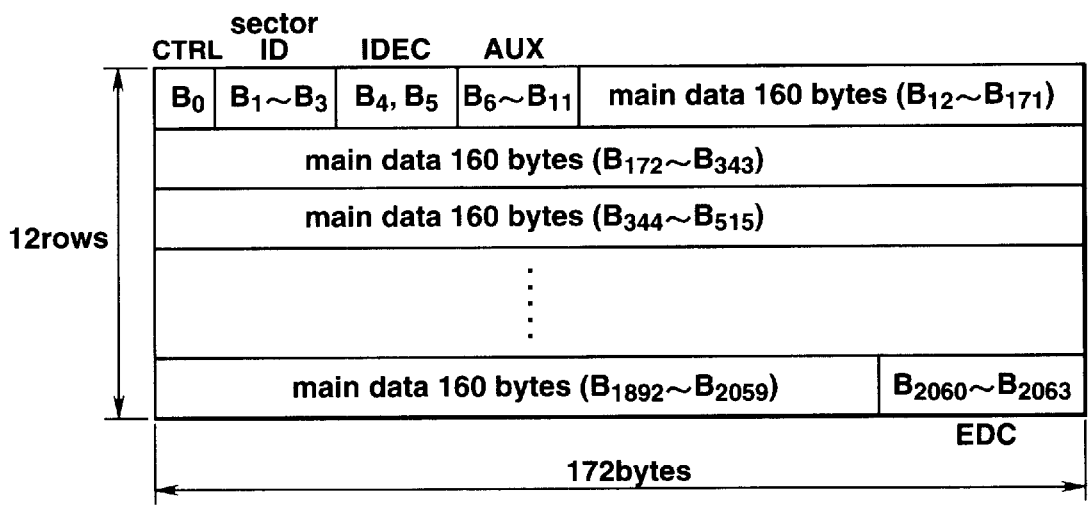
FIG. 17 is a view for explaining more practical example of recording format of optical disc.

FIGS. 16A to 16E are views for explaining the principle of the operation of an optical disc reproducing apparatus to which the first method is applied as the first embodiment of this invention. FIG. 16A shows one sector of recording tracks on the optical disc, wherein data pattern of first mark length, e.g., 2T is recorded in a predetermined first area, e.g., AUX (Auxiliary) area within one sector as shown in FIG. 16B. This 2T data pattern is data pattern in which "00" and "11" are alternately repeated in the NRZ form. In the standard of MD2 which is extended standard of the so-called MD (mini disc trade name by SONY Corporation), the above-mentioned AUX area is provided in accordance with the format shown in FIG. 17. Namely, from the leading portion of the logical sector consisting of 172 bytes×12 rows (lines), control area of 1 byte, sector ID area of 3 bytes, IDECC (IDEC) area of 2 bytes, AUX (auxiliary data) area of 6 bytes, main data area of 2048 bytes and EDC (Error Detection Code) area of 4 bytes are disposed (assigned) in order, and the 2T data pattern is written in advance in the AUX area thereof.

FIG. 16C shows an example of reproduction signal, and such an approach is employed to determine amplitude of signal obtained by reproducing the AUX area, in more practical sense, amplitude X of data sample obtained by allowing reproduction RF signal to undergo A/D conversion and amplitude Y of envelope of signal obtained by reproducing second area except for the AUX area (first area), e.g., data area to allow ratio between these amplitudes X/Y to be resolution.

Figure 18:
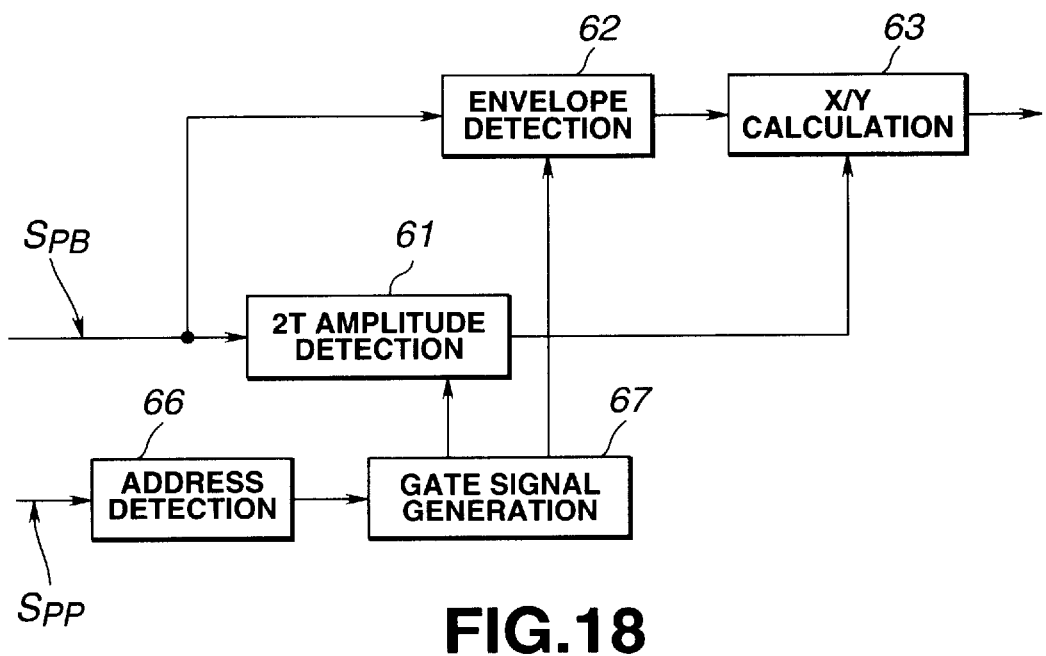
FIG. 18 is a block circuit diagram showing an example of more practical circuit configuration of resolution detecting section.

FIG. 18 shows a more practical circuit configuration of the portion corresponding to the resolution detecting section 15 of FIG. 1. In FIG. 18, reproduction signal $S_{PB}$ is sent to a 2T amplitude detecting circuit 61 and an envelope detecting circuit 62. At the 2T amplitude detecting circuit 61, amplitude X of reproduction signal of the AUX area (first area) is detected. At the envelope detecting circuit 62, envelope amplitude Y of reproduction signal of other area (second area) is detected. These amplitudes X, Y are sent to an X/Y calculating circuit 63. Thus, amplitude ratio X/Y as resolution is determined.

Moreover, an address detecting circuit 66 of FIG. 18 is supplied with signal $S_{PP}$ for reproducing address on the recording track of the optical disc, and is operative to detect address from this signal $S_{PP}$ to send it to a gate signal generating circuit 67 to respectively generate a gate signal caused to be at "H" level in the AUX area (first area) as shown in FIG. 16D and a gate signal caused to be at "H" level in other area (second area) as shown in FIG. 16E to respectively send them to the 2T amplitude detecting circuit 61 and the envelope detecting circuit 62. In this example, the above-mentioned signal $S_{PP}$ is detected as a push-pull signal by the optical head in the case where it is modulated in such a manner that, e.g., guide grooves of recording tracks are wobbled in accordance with absolute address information. In addition, the 2T amplitude detecting circuit 61 and the envelope detecting circuit 62 of FIG. 18 substantially correspond to the signal level detecting circuit 11 of FIG. 1, and the X/Y calculating circuit 63 substantially corresponds to the resolution calculating circuit 12 of FIG. 1.

This amplitude ratio X/Y is sent to the reproduction control circuit 20 of FIG. 1 as signal indicating resolution. Thus, the reproduction control circuit 20 carries out reproduction power control so that resolution becomes close to the reference value K from the reference value output circuit 13, i.e., carries out light emitting drive control of laser light source of the head 2 to carry out correction (aperture correction) such that the above-mentioned detection window (aperture) is optimized.

In accordance with the first embodiment, it is sufficient to only write data of pattern of specific mark length (e.g., 2T) into predetermined areas (e.g., AUX areas) provided every respective sectors. Thus, there is no necessity to provide, in data area, etc. of the optical disc, dedicated recording mark for detecting resolution. Reduction in recording capacity does not takes place, and detections of resolutions can be carried out every sectors.

Figure 19:
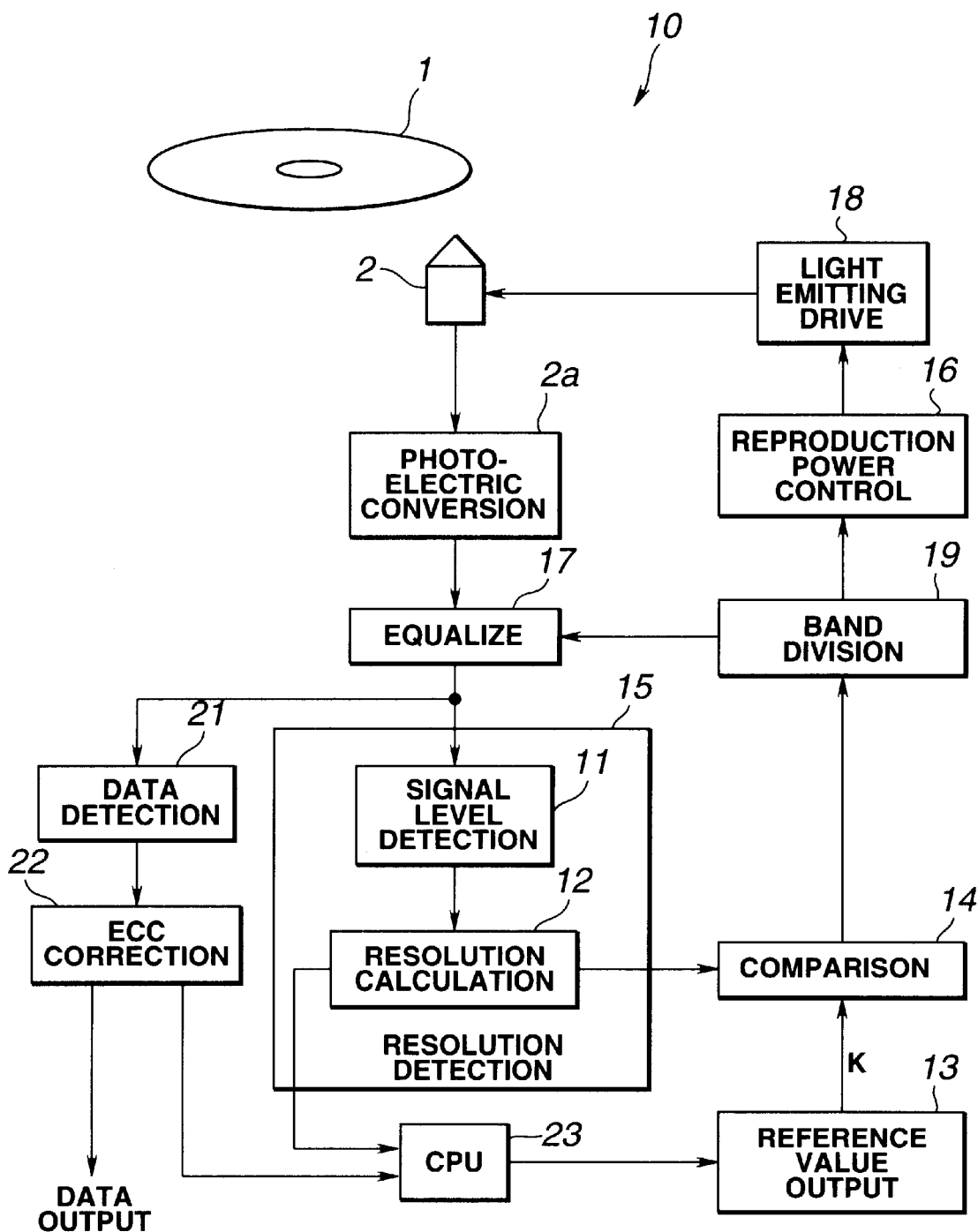
FIG. 19 is a block circuit diagram showing an example of optical disc apparatus to which a second embodiment of this invention is applied.
Figure 20:
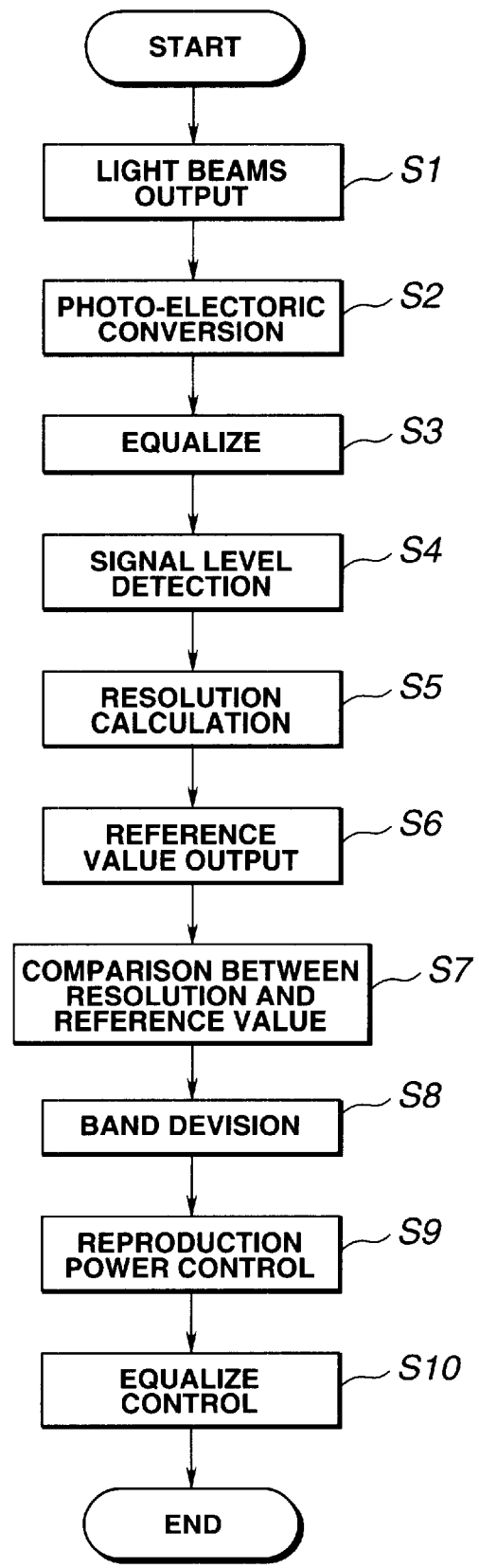
FIG. 20 is a flowchart for explaining outline of operation of the second embodiment.

The second embodiment of this invention will now be described. This second embodiment is directed to an apparatus adapted for detecting resolution from signal level distribution of reproduction signal. An example of the configuration of the optical disc reproducing apparatus to which the second embodiment is applied is shown in FIG. 19. In addition, outline of the operation of the optical disc reproducing unit (apparatus) 10 shown in FIG. 19 is shown in the flowchart of FIG. 20.

In this optical disc reproducing unit 10 shown in FIG. 19, super resolution optical disc as described above is used as optical disc 1. At the first step S1 of FIG. 20, light beams (laser beams) are irradiated from head 2 onto the optical disc 1. Thus, reflected light from the optical disc 1 is detected by a photo-electric conversion element (photo-detector) 2a of the head 2, resulting in reproduction signal (photo-electric conversion of step S2 of FIG. 20). The reproduction signal thus obtained is sent to an equalizing circuit (equalizer) 17. At step S3, the equalizing circuit 17 carries out equalization (waveform equalization) of reproduction signal. As such equalizing circuit 17, e.g., cosine equalizer, etc. may be used so that its equalization characteristic (e.g., equalization gain) is controlled. Reproduction signal outputted from the equalizing circuit 17 is sent to both signal level detecting circuit 11 of resolution detecting section 15 and data detecting circuit 21 which will be described later.

At the resolution detecting circuit 15, signal level is detected by the signal level detecting circuit 11 (step S4) and statistical processing as described later is carried out. Thus, resolution is calculated by resolution calculating circuit 12 (step S5). A signal indicative of the resolution thus obtained is sent to a comparison circuit 14. The comparison circuit 14 is supplied with reference value K outputted from reference value output circuit 13 (step S6).

At the comparison circuit 14, there is carried out comparison between resolution from the resolution calculating circuit 12 of the resolution detecting section 15 and the reference value K from the reference value output circuit 13 (step S7). Thus, its comparison result, i.e., signal indicating error component between resolution and the reference value K is sent to a band dividing (division) circuit 19. At the band dividing circuit 19, signal indicating resolution, in more practical sense, signal of error component between resolution and reference value K is band-divided into d.c. component, lower frequency component and higher frequency component (step S8). The d.c. component and the lower frequency component are sent to a reproduction power control circuit 16 so that they are used for reproduction power control (step S9), and the higher frequency component is sent as control signal to the equalizing circuit 17 so that it is used for equalization control (step S10). In this example, with respect to reproduction power, control by lower frequency band components (d.c. component and lower frequency component) gentle in time change like environmental temperature change of medium is carried out. In addition, the higher frequency component is used for control of equalize characteristic, such as, for example, equalize gain adjustment.

It is tot be noted that the system of band-dividing such signal indicating resolution (signal of error component between resolution and reference value K) into d.c. component lower frequency component and higher frequency component to carry out reproduction power control by the d.c. component and the lower frequency component, ad to control the equalize characteristic by the higher frequency component can be applied to the above-described first embodiment.

Moreover, reproduction signal from the equalizing circuit 17 is sent to data detection circuit 21, at which data detection (data reproduction) is carried out by, e.g., PR (1, 2, 1) detection of partial response. In more practical sense, in the case of PR (1, 2, 1) detection of 1–7 NRZI modulated signal, the signal level is divided into four values (levels). Thus, binary data is reproduced by Viterbi decoding (maximum likelihood decoding), etc. Reproduction data from the data detecting circuit 21 is sent to an ECC (Error Correction Code) circuit 22, at which it is error-corrected. The error-corrected data thus obtained is taken out as data output. In addition, for the purpose of setting reference value K which will be described later, bit error information from the ECC circuit 22 is sent to a CPU 23. Thus, resolution from the resolution calculating circuit 12 when bit error rate is minimum is set as reference value K. This reference value K is outputted from the reference value output circuit 13 and is sent to the comparison circuit 14.

Explanation will now be given in detail with reference to FIGS. 21A and 21B in connection with resolution detecting operation in the resolution detecting section 15 of FIG. 19

At the signal level detecting circuit 11 of the resolution detecting section 15, such an approach is employed to carry out sampling of inputted reproduction signal by data clock to allow them to be data samples (which will be hereinafter referred to as sampled peak value or signal level data as occasion may demand) to determine frequency distribution (histogram) of these data samples. FIG. 21A shows data samples obtained by carrying out sampling of reproduction signal and clock pulse of data clock, an (FIG. 21B shows frequency distribution or signal level distribution of data samples thus obtained. FIGS. 21A, 21B are example of signal when 1–7 NRZI-modulated signal is reproduced by a predetermined reproduction characteristic, wherein, as distribution of signal level V(x), signal level is substantially divided into four values. Peaks appear at positions of Va, Vb, Vc and Vd in order from the lower signal level. Data samples are obtained in the vicinity of these signal levels Va, Vb, Vc and Vd in a concentrated manner. The signal levels Vb, Vc correspond to signal level when, e.g., reproduction signal of repetitive pattern of mark length 2T is caused to undergo sampling, and the signal levels Va, Vd correspond to signal level when, e.g., reproduction signal of repetitive pattern of mark length 4T is caused to undergo sampling. In practice, since patterns except for 2T or 4T pattern are also included in ordinary data, and because of influence of waveform rounding and/or jitter at the time of reproduction etc., dispersion or scattering takes place in the sampled peak (pulse-height) value. As a result, there is indicated (obtained) frequency distribution or signal level distribution of data samples as shown in FIG. 21B.

Figure 21:
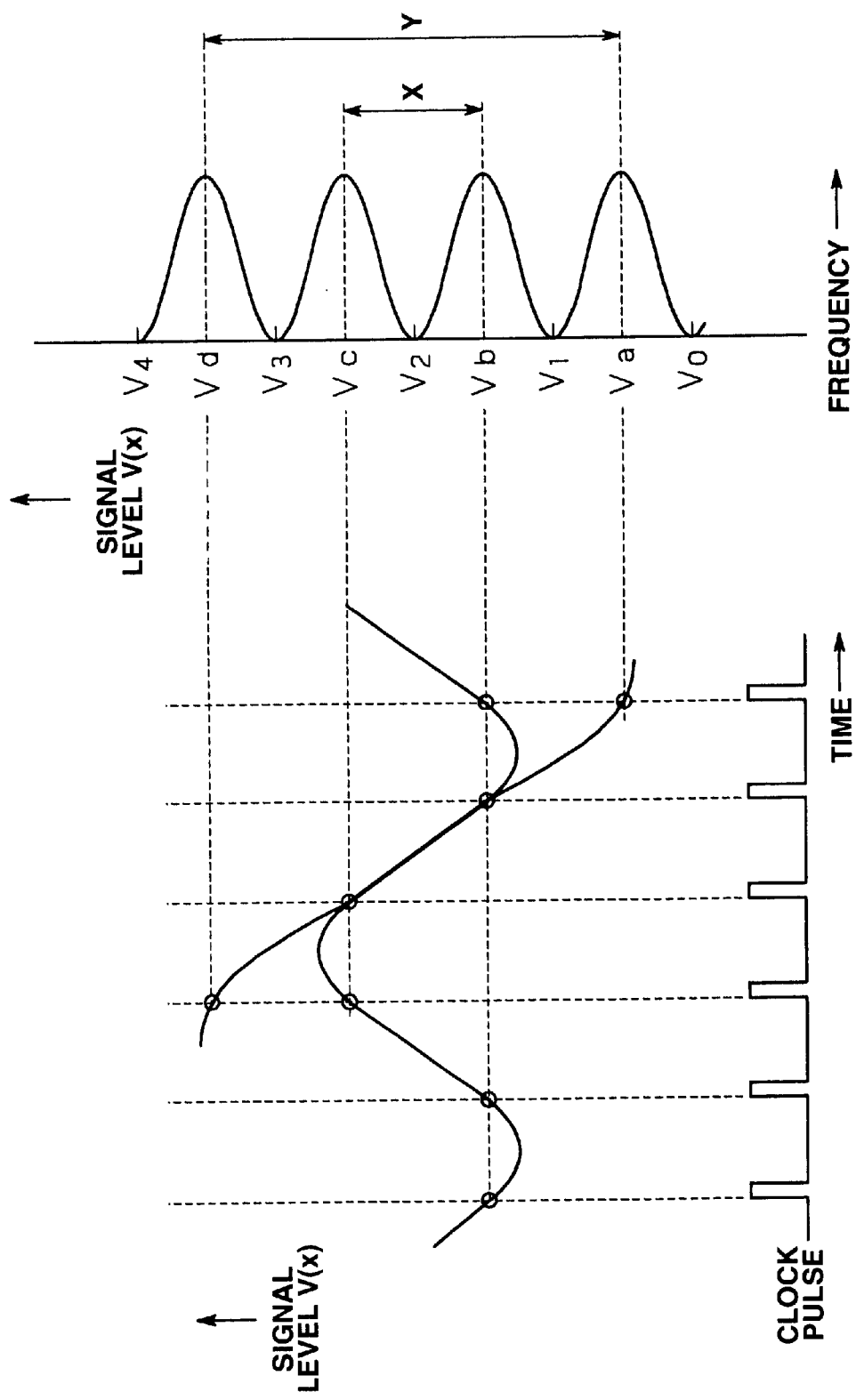
FIGS. 21A and 21B are views showing reproduction signal and signal level distribution for explaining resolution detecting operation of the second embodiment.

With respect to such signal level distribution of FIG. 21B, statistical processing is implemented to portions of respective mountains (portions in the vicinity of respective peaks) to detennine respective representative values, e.g., signal levels of mean (average) values of respective portions or signal levels Va, Vb, Vc, Vd at respective peak positions. With respect to signal levels Va, Vb, Vc, Vd as these representative values, at least two pairs of signal levels located at positions symmetrical with change point or zero cross point of signal (point crossing with d.c. level of signal) being as center, i.e., positions substantially equal to each other in distance from d.c. level of signal with change point of signal being put therebetween, i.e., e.g., pair of Vb and Vc and pair of Va, Vd are determined to determine respective internals X, Y of these signal level pairs. In this case, the interval X between the pair of the signal levels Vb, Vc corresponds to, e.g., amplitude of data sample of reproduction signal of pattern of mark length 2T, and the interval Y between the pair of the signal levels Va, Vd corresponds to, e.g., amplitude of data sample of reproduction signal of pattern of mark length 4T. It is to be noted that since patterns except for 2T or,4T pattern are also included in ordinary data as previously described, there is mentioned the case where data samples are represented below including bits before and after. as original data obtained in the vicinity of the respective signal levels Va, Vb, Vc, Vd Va: (0, 0̲, 0)

Vb: (1, 0̲, 0), (0, 0̲, 1), (0, 1̲, 0)

Vc: (1, 1̲, 0), (1, 0̲, 1), (0, 0̲, 1)

Vd: (1, 1̲, 1) At the bit positions of underlines of these original data, data samples in the vicinity of the respective signal levels Va, Vb, Vc, Vd can be obtained.

Ratio X/Y between respective amplitudes X, Y determined in this way is outputted from the resolution calculating circuit 12 of FIG. 19 and is sent to the comparison circuit 14.

It is to be noted that since signal level is divided into four values in the case of carrying out PR, (1, 2, 1) detection of 1–7 NRZI modulated signal in the data detection circuit 21 as described above, a portion of the operation at the resolution detecting circuit 15 overlaps with a portion of the operation at the data detecting circuit 21, whereby an approach may be employed to allow such operations to be common to use, at the resolution detecting circuit 15, result in the middle of data detection processing at the data detecting circuit 21. In addition, as shown in FIG. 19, resolution detection and data detection may be respectively independently carried out in parallel.

Figure 22:
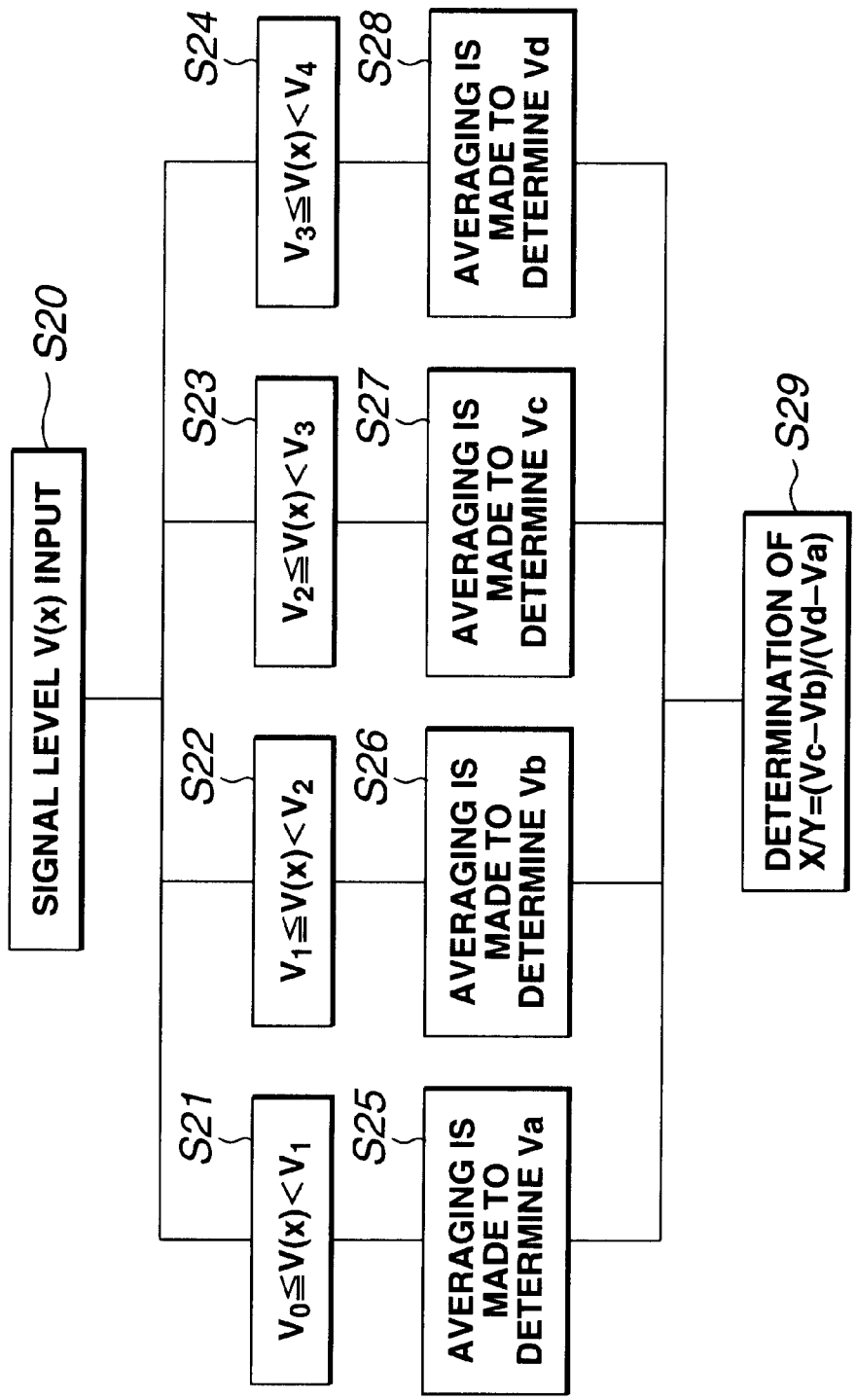
FIG. 22 is a view for explaining more practical example of resolution detecting operation of the second embodiment.

FIG. 22 is a view for explaining a more practical example of the above-described resolution detecting operation. In this FIG. 22, at step S20, signal level V(x) is inputted. To what the above-mentioned four portions this signal level V(x) belongs is discriminated at respective steps S21 to S24. In more practical sense, it is sufficient to determine in advance four areas of $V_0 \sim V_1$, $V_1 \sim V_2$, $V_2$, $V_2 \sim V_3$, $V_3 \sim V_4$ so that the respective signal levels Va, Vb, Vc, Vd are substantially center to discriminate between these four areas $V_0 \sim V_1$, $V_1 \sim V_2$, $V_2 \sim V_3$, $V_3 \sim V_4$ into which inputted signal level V(x) is entered. With respect to signal levels V(x) of respective areas discriminated at the steps S21 to S24, statistical processing thereof are carried out every respective areas. Thus, representative values are determined. In more practical sense, at respective steps S25 to S28, signal levels V(x) every respective areas are respectively averaged, for example, to determine signal levels Va, Vb, Vc, Vd as representative values of respective areas. At the subsequent step S29, amplitude ratio X/Y, i.e., (Vc-Vb)/(Vd-Va) is detenmine because X=Vc-Vb and Y=Vd-Va. The amplitude ratio thus obtained is outputted as resolution.

In this example, statistical processing based on signal level distribution shown in FIG. 21B may be carried out at the signal level detecting circuit II side of FIG. 19, or may be carried out at the resolution calculating circuit 12 side thereof.

In this way, signal of resolution X/Y outputted from the resolution detecting section 15 of FIG. 19 is sent to the comparison circuit 14, at which it is compared with reference value K. The reference value K outputted from the reference value output circuit 13 will now be described in detail.

This reference value K is resolution when detection window (aperture) is optimized as described above, and is also target value of aperture correction control. In more practical sense, resolution when jitter or error rate at the time of data detection is minimum may be determined to set it as reference value K. In addition, with respect to signal level distribution of FIG. 21B, resolution when sum total of dispersions a of local distributions of data samples in the vicinity of respective peaks is minimum may be determined to set it as reference value K. This is also apparent from the fact that when jitter of reproduction signal, etc. is less or small, local distributions of four values of FIG. 21B become narrow (dispersions a becomes small). Namely, when dispersions of local distributions in the vicinity of respective signal levels Va, Vb, Vc, Vd of FIG. 21B are respectively assumed to be $\sigma_a$, $\sigma_b$, $\sigma_c$, $\sigma_d$, it is sufficient to set, as the reference value K, resolution X/Y when sum total ($\sigma_a + \sigma_b + \sigma_c + \sigma_d$) of these dispersions is caused to be minimum. Such detection of minimum point can be realized by carrying out trial reproduction while changing reproduction power, or while carrying out sweeping.

Figure 23:
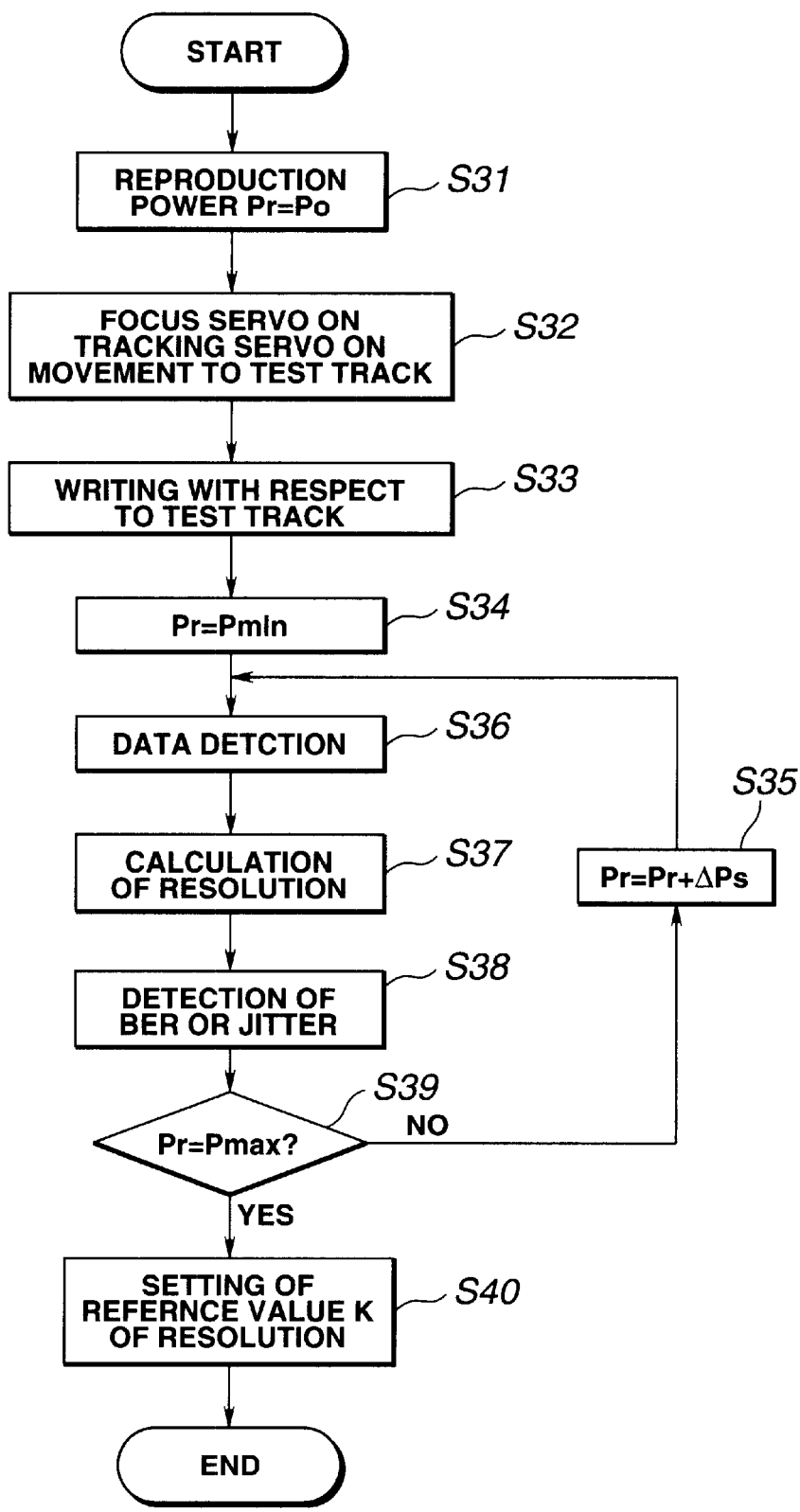
FIG. 23 is a flowchart for explaining an example of setting operation of reference value.

FIG. 23 shows an example of setting operation of the reference value K, and shows the example where resolution when bit error rate (BER) or jitter of data detected from reproduction signal is minimum is caused to be reference value K. In addition, the setting operation is similar also in the case where resolution when sum total of dispersions of local distributions of respective values of the distribution of signal levels is minimum is caused to be reference value K.

The CPU 23 of FIG. 19 carries out setting operation of this reference value K at the time of disc loading of the optical disc, regularly (periodically) at predetermined time intervals, or every time count number (value) of recording/reproducing operations reaches a predetermined nwnber (value).

For example, at the time of loading of the optical disc 1 of FIG. 19, the CPU 23 starts operation of FIG. 23. Namely, the CPU 23 sets reproduction (readout) power Pr of laser light source within the head 2 to a predetermined value $P_0$ at the first step S31. This predetermined value $P_0$ is a value sufficient for obtaining reproduction power such that track access of disc can be made. At step S32, focus servo and tracking servo are both turned ON to move the head 2 to test track for trial reproduction. At the subsequent step S33, data for trial reproduction is written with respect to (onto) test track. At step S34, the reproduction power Pr is caused to be minimum power, Pmin within the sweeping range.

At the subsequent step S36, data detection (data reproduction) is carried out at data detecting circuit 21 of FIG. 19. At step S37, resolution calculation is carried out, i.e., the above-mentioned amplitude ratio X/Y is determined. At step S38, bit error rate (BER) or jitter is detected. The resolution calculation at the step S37 may be carried out before the step S36 or after the step S38, or may be carried out simultaneously with these steps S36, S38. At the subsequent step S39, whether or not reproduction power Pr reaches maximum power Pmax within the sweeping range is discriminated. When the discrimination result is NO, the processing returns to the step S36 through step, S35. In this example, at the step S35, power incremental value ΔPs corresponding to one step in sweeping the reproduction power Pr is added (Pr=Pr+ΔPs). In this way, reproduction power Pr is incremented by ΔPs to repeatedly carry out trial reproduction.

When it is discriminated at step S39 that discrimination result is YES, i.e., reproduction power Pr reaches maximum power Pmax, the processing proceeds to step S40 to set reference value K of resolution. In more practical sense, as described above, resolution X/Y at reproduction power when BER (Bit Error Rate) or jitter is minimum is set as reference value K to store it into reference value output circuit 13 of FIG. 19. ihe reference value output circuit 13 sends, at all times, the set reference value K to the comparison circuit 14 during signal reproduction operation.

It is to be noted that while, in the example of FIG. 23, reproduction power Pr is swept to determine the point where BER (Bit Error Rate) or jitter is minimum, it is a matter of course that such an approach may be employed to determine point where sum total of dispersions every local distributions of the signal level distribution is minimum to set resolution X/Y at this time as reference value K. In addition, the method of setting reference value K as explained above is applicable to the first embodiment as it is.

In accordance with the second embodiment of this invention as described above, there is no necessity of recording, in advance, signal of a specific mark length onto optical disc and resolution can be detected from signal level distribution of reproduction signal of typical or ordinary data. For this reason, without increasing redundancy and without requiring special clock for amplitude detection, resolution information of high accuracy can be obtained. In addition, since such an approach is employed to carry out frequency analysis to carry out aperture correction in the state where reproduction power control and equalize control are combined, improvement in accuracy and stability can be made.

The third embodiment of this invention will now be described. This third embodiment is[ c]haracterized in that data pattern is detected from reproduction signal to detect resolution on the basis of signal level corresponding to the detected data pattern.

Figure 24:
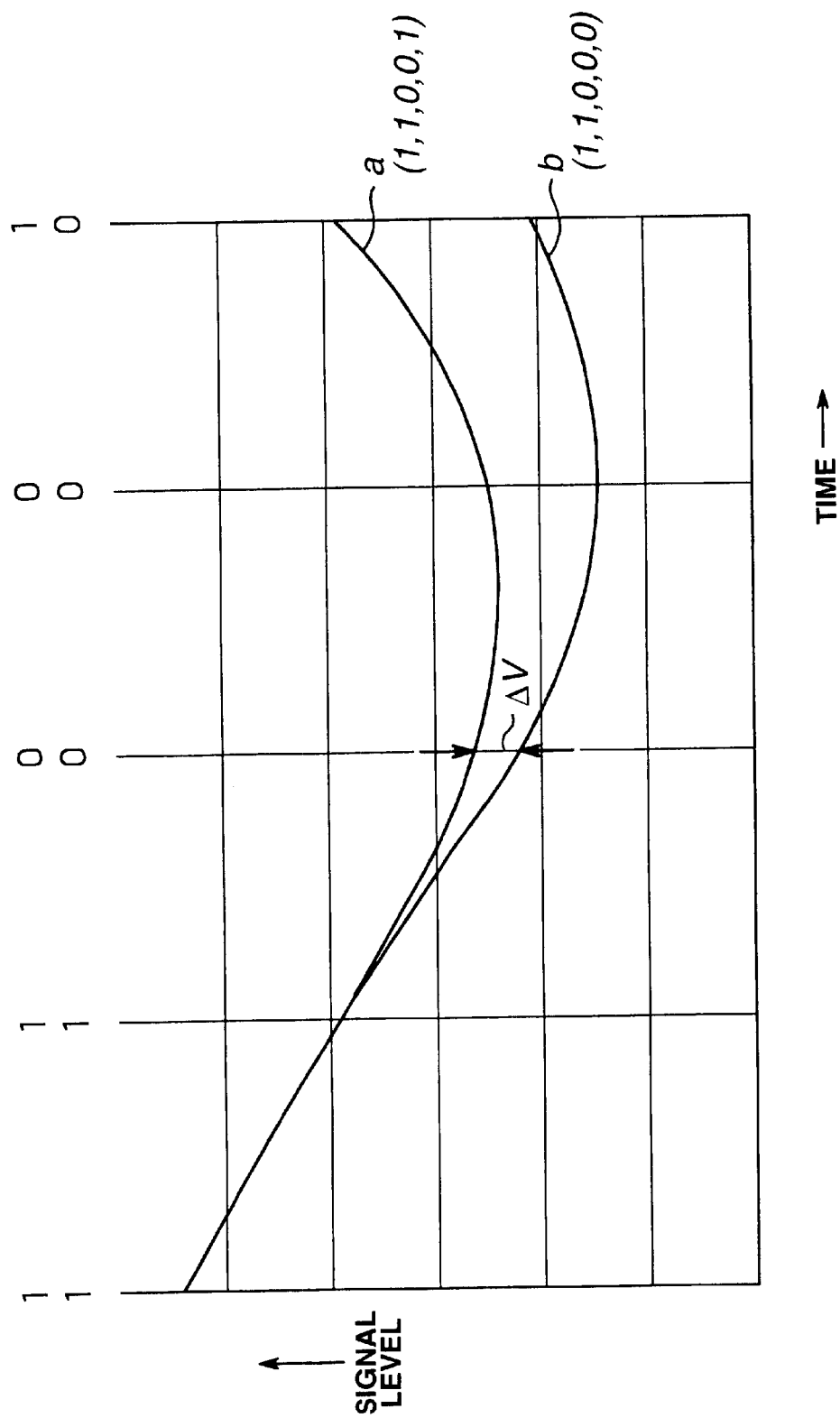
FIG. 24 is a view showing difference of signal level of reproduction signal by data pattern.

In this case, FIG. 24 shows difference of signal level by data pattern and illustrates respective reproduction signal levels in the case where original data is "11001" (curve a) and in the case where original data is "11000" (curve b). As is clear from this FIG. 24, level error ΔV takes place in signal level at position of next "0" of "1" of respective curves a, b by difference of original data pattern.

Figure 25:
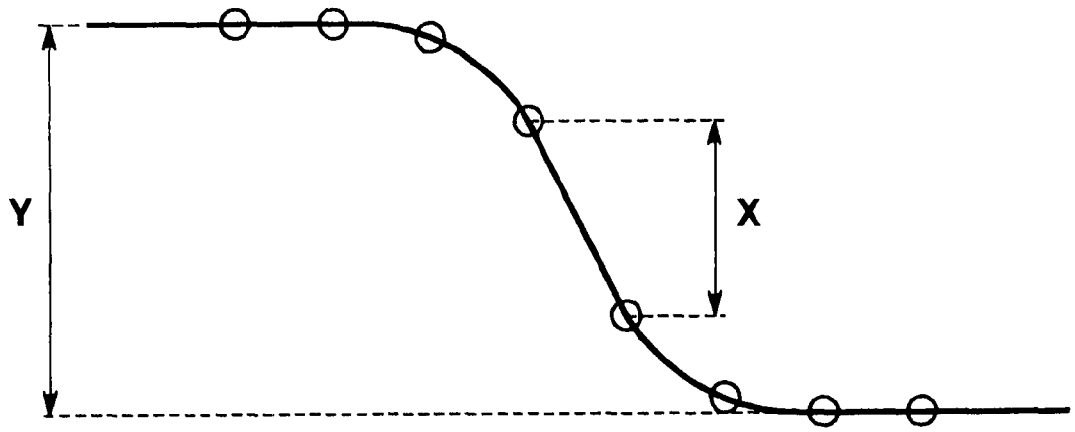
FIG. 25 is a view showing first level difference between data samples before and after change point of reproduction signal waveform and second level difference between data samples except for the above.

Accordingly, in reproduction signal waveform as shown in FIG. 25, for example, an approach is employed to determine, in accordance with data pattern, interval of signal level (first level difference) X between data samples before and after with change point when original data pattern changes from "1" to "0" being put therebetween, and to determine interval of signal level (second level difference) Y with respect to data samples except for the data samples before and after with this change point being put therebetween, thus making it possible to calculate ratio between these amplitudes (amplitude ratio) X/Y as resolution. In this case, with respect to data samples except for data samples before and after with the change point being put therebetween, it is sufficient to determine respective signal levels when data of the same polarity are successive by a predetermined number (e.g., 4) to allow interval between these signal levels to be second level difference Y. Namely, in the example of FIG. 25, interval between signal level when four "1" or more are successive and signal level when four "0" or more are successive is caused to be second level difference Y. It should be noted that only first level difference X may be used to detenmine resolution.

Figure 26:
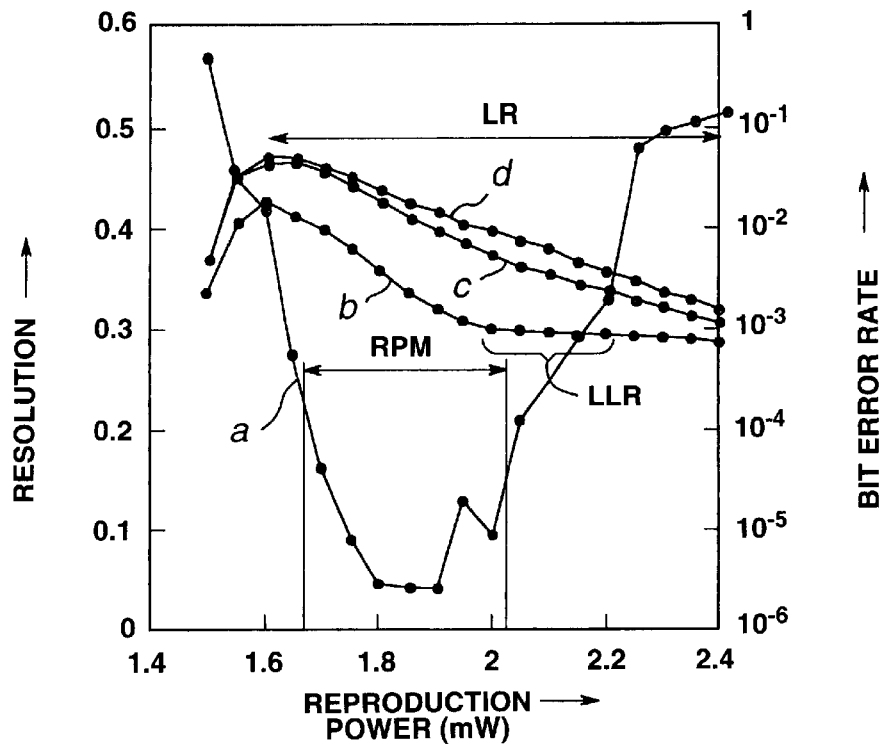
FIG. 26 is a view showing an example of change of bit error rate and resolution with respect to change of reproduction power.
Figure 27:
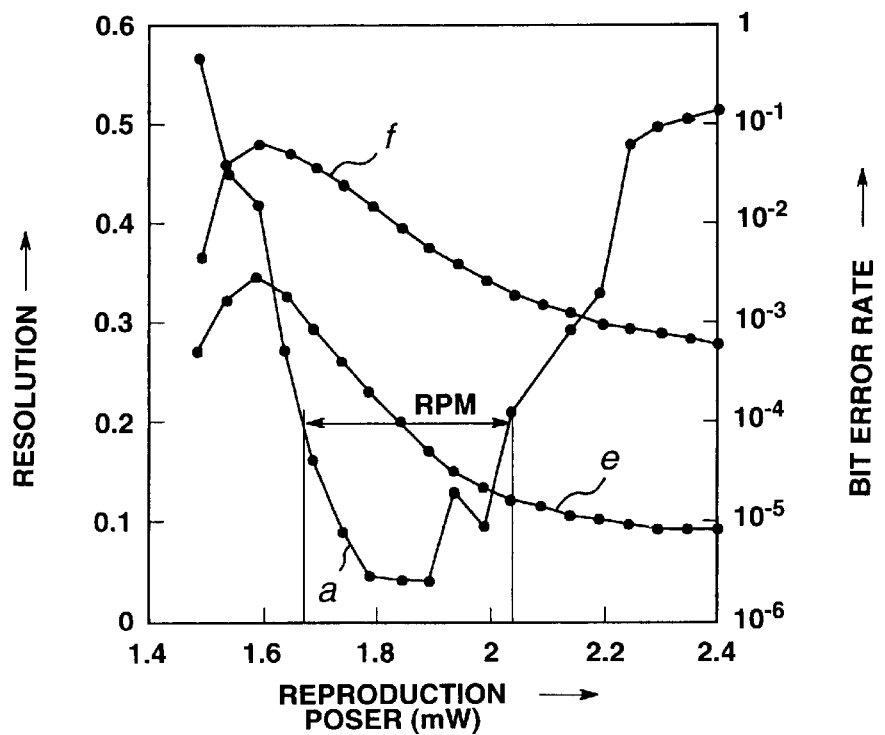
FIG. 27 is a view showing another example of change of bit error rate and resolution with respect to change of reproduction power.

FIG. 26 shows the state of change of bit error rate and resolution with respect to change of reproduction (readout) power. Namely, curve a indicates bit error rate, curve b indicates resolution (X/Y) of signal in which original data pattern is 2T or more, curve C similarly indicates resolution when such data pattern is 3T or more, and curve d indicates resolution when such data pattern is 4T or more. In addition, FIG. 27 indicates, with respect to reproduction power, bit error rate (curve a) and respective resolutions (curves e and f) when original data patterns are respectively 2T and 3T. In this case, the data patterns of 2T or more - 4T or more, and data patterns of 2T, 3T are as follows:

2T or more: . . . xx1100xx . . .

3T or more: . . . x111000x . . .

4T or more: . . . 11110000 . . .

2T: . . . 00110011 . . .

3T: . . . 01110001 . . .

In the above expression, x may take either 1 or 0 (don't care).

In the example of FIG. 26, with respect to curve b of resolution of 2T or more, linearlity is lost at the portion LLR where reproduction power is about 2 mW. On the contrary, with respect to curves c, d of respective resolutions when original data patterns are respectively 3T or more and 4T or more, linearlity can be obtained in the area LR of substantially 1.6~2.4 mW. These curves are suitable for detection of resolution. Moreover, in the example of FIG. 27, curve f of resolution of 3T has better linearlity as compared to curve e of resolution of 2T. It is to be noted that since frequency where only 3T patterns appear is lower than frequency where patterns of 3T or more take place, it is preferable for detection of resolution to detect pattern of 3T or more, or pattern of 4T or more. In addition, in the examples of FIGS. 26 and 27, reproduction vower margin RPM when viewed from the bit error rate is substantially 1.66~2.04 mW. In view of these points, it is mentioned to detect, e.g., data pattern of 3T or more from reproduction signal to determine the X and the Y from signal level of data pattern of 3T or more to calculate resolution X/Y.

Figure 28:
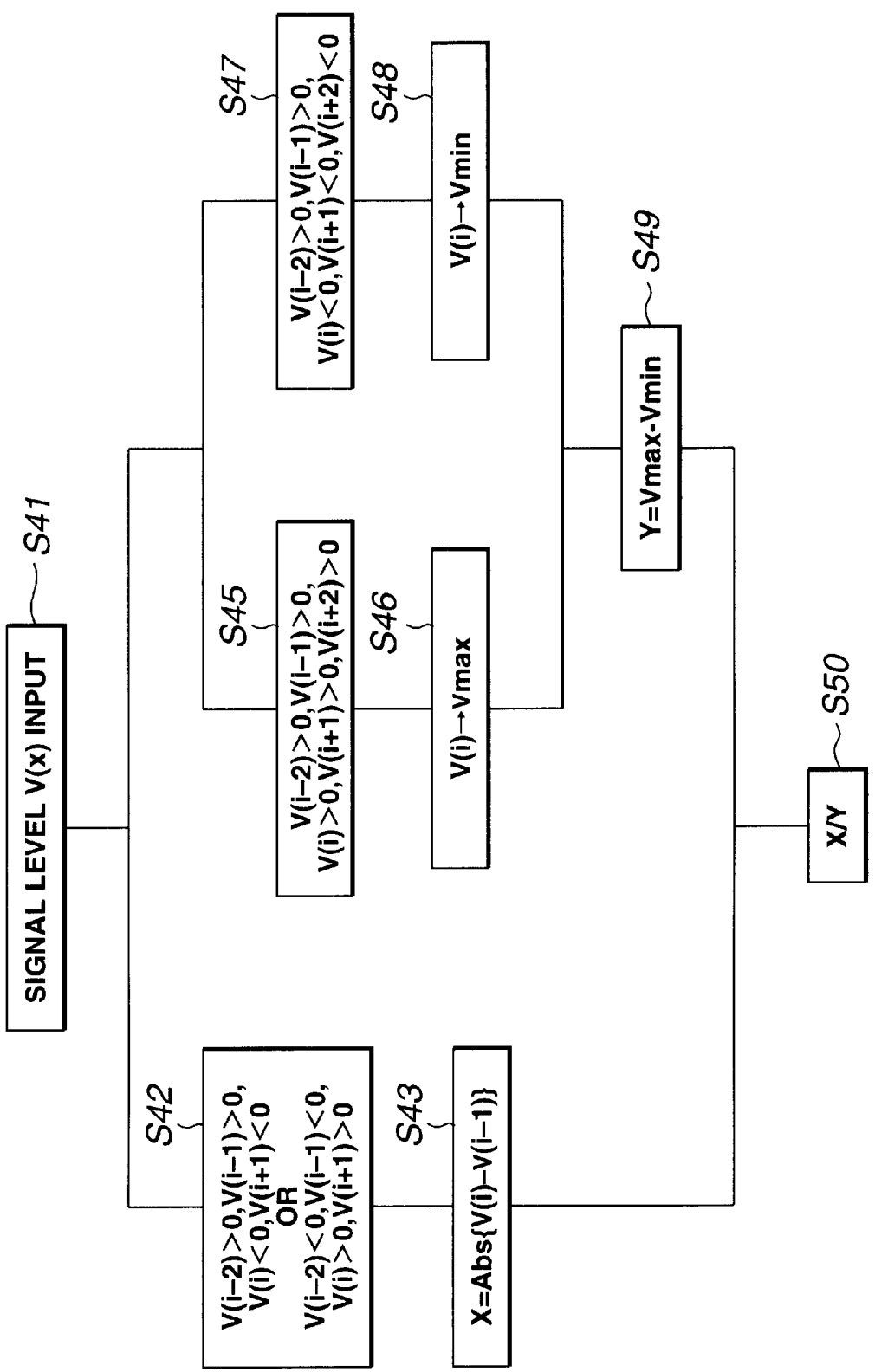
FIG. 28 is a view for explaining a more practical example of resolution detecting operation of a third embodiment of this invention.

FIG. 28 is a view for explaining more practical example of resolution detection of the third embodiment. In FIG. 28, signal level V(x) is inputted at step S41 and data pattern is examined at steps S42, S45, S47. In this case, when number of remarked data sample at Current time point (position on the time axis or base) in the calculation process of resolution detection is assumed to be i, there is discriminated at step S42 whether signal levels V(i−2), V(i−1) of past two samples are both positive and signal levels V(i), V(i+1) of past 2 samples at times subsequent to current time point are both negative, or signal levels V(i−2), V(i−1) of past 2 samples are both negative and signal levels V(i), Vi(+1) of 2 samples at times subsequent to current time point are both positive, whereby when this condition is satisfied, absolute value of difference between signal levels V(i) and V(i−1) is caused to be first level difference X at step S43. Namely, X=Abs(V(i)~V(i−1)) is caused to hold. Moreover, whether or not signal levels V(i−2)~V(i+2) of 5 samples including two samples before and after remarked sample at current time point are all positive is discriminated, whereby when this condition is satisfied, signal level V(i) is caused to be maximum level Vmax at step S46. Similarly whether or not signal levels V(i−2)~V(i+2) of 5 samples including two samples before and after remarked sample at current time point are all negative is discriminated, whereby when this condition is satisfied, signal level V(i) is caused to be minimum level Vmin at step S48. Further, at step S49, difference Vmax~Vmin between maximum level Vmax and minimum level Vmin is calculated. The value thus calculated is caused to be the second level difference Y, i.e., Y=Vmax~Vmin. At step S50, ratio (amplitude ratio) X/Y between X determined at the step S43 and Y determined at the step S49 is calculated. The value thus calculated is outputted as resolution.

As the optical disc reproducing apparatus to which the third embodiment can be applied, e.g., the optical disc apparatus shown in FIG. 19 is mentioned. Namely, at resolution detecting section 15 of the optical disc reproducing apparatus of FIG. 19, resolution detecting operation as shown in FIG. 28 is carried out. A signal of resolution thus obtained (amplitude ratio X/Y) is sent to comparison circuit 14, at which it is compared with the reference value K from reference value output circuit 13. A signal indicating error component between resolution and reference value K, which is comparison result, is sent to band dividing circuit 19. Since operations at times subsequent thereto are similar to those of the second embodiment, their explanation is omitted.

It is to be noted that, with respect to reference value K, as explained in the second embodiment, it is sufficient to set, as reference value K, resolution at the time of reproduction power when optimum reproduction signal can be obtained while sweeping reproduction power, e.g., at the time of disc loading or regularly at a predetermined period, and the optimum state of reproduction signal can be recognized from the fact that the error rate is minimum or jitter is minimum, or sum total of dispersions of local distributions of signal level distribution of reproduction signal is minimum, etc.

In accordance with the third embodiment of this invention as described above, there is no necessity to record, in advance, a signal of specific mark length on the optical disc, and such an approach is employed to detect signal level in accordance with pattern from reproduction signal of general or ordinary data, thereby making it possible to determine resolution. For this reason, redundancy is not increased, so recording capacity of the medium is not reduced. Moreover, special clock for detecting amplitude is not required, thus making it possible to stabely obtain resolution information of high accuracy. Further, since frequency analysis is carried out to combine reproduction power control and equalize control to carry out aperture correction, improvements in the accuracy and the stability can be made.

It is to be noted that this invention is not limited only to the above-described embodiments. For example, specific mark length pattern is not limited to patterns of 2T, 4T, but other patterns may be used. Further, the recording medium is not limited to magnetic super resolution disc, but this invention can be similarly applied also to phase change super resolution disc or ROM super resolution disc. In addition, this invention can be applied to recording media except for disc.

What is claimed is:

1. An information reproducing apparatus adapted for irradiating light beams with respect to a recording medium including a recording layer and a reproduction (readout) layer to open, at the reproduction layer, detection window smaller than irradiation range of light beams to thereby read out recording information of the recording layer, the apparatus comprising:

resolution detecting means for detecting resolution on the basis of signal level of a specific mark length signal corresponding to specific mark length data in a reproduction signal reproduced from the recording medium;

reference value output means for outputting reference value of the resolution; and reproduction (readout) control means for controlling size of the detection window so that the resolution becomes close to the reference value, wherein the resolution detecting means extracts the specific mark length signal from a reproduction signal obtained by reproducing a first area in which the specific mark length data is recorded in advance of the optical disc to detect amplitude of the specific mark length signal, and to detect amplitudes from envelope of a signal of a second area except for the first area, thus to detect the resolution on the basis of ratio between these amplitudes.

2. An information reproducing apparatus as set forth in claim 1, wherein the resolution detecting means is operative so that when unit time of channel bit is assumed to be T as the specific mark length data, it extracts the specific mark length signal from data of mark length of 2T and data of mark length of 4T or more.

3. An information reproducing apparatus adapted for irradiating light beams with respect to a recording medium including a recording layer and a reproduction (readout) layer to open, at the reproduction layer, detection window smaller than irradiation range of light beams to thereby read out recording information of the recording layer, the apparatus comprising:

resolution detecting means for detecting resolution on the basis of signal level of a specific mark length signal corresponding to specific mark length data in a reproduction signal reproduced from the recording medium;

reference value output means for outputting reference value of the resolution; and reproduction (readout) control means for controlling size of the detection window so that the resolution becomes close to the reference value, wherein the reference value output means outputs, as the reference value, optimum ratio of amplitude of the specific mark length signal, and the optimum ratio of amplitude is the amplitude ratio when dispersions of signal levels in the vicinity of respective peaks are respectively determined every the peaks of distribution of signal levels of the reproduction signal and sum total value of these dispersions is minimum.

4. An information reproducing apparatus as set forth in claim 3, wherein the reference value is set at the reference value output means at the time of disc loading of the optical disc or regularly (periodically).

5. An information reproducing apparatus as set forth in claim 3, wherein the resolution detecting means detects the resolution from signal level distribution of the reproduction signal.

6. An information reproducing apparatus as set forth in claim 5, wherein the resolution detecting means detects, from the signal level distribution, the resolution on the basis of ratio between amplitude of a signal corresponding to data of a first mark length and amplitude of a signal corresponding to data of a second mark length longer than the first mark length.

7. An information reproducing apparatus as set forth in claim 6, wherein when unit time of channel bit is assumed to be T, the first mark length is 2T and the second mark length is 4T.

8. An information reproducing apparatus as set forth in claim 5, wherein the resolution detecting means carries out statistical processing of signal levels in the vicinity of respective peaks every the peaks of the signal level distribution to determine respective representative values to determine at least two pairs of signal levels substantially equal to each other in distance from d.c. level with change point of the signal of these representative values being put therebetween to detect the resolution on the basis of comparison ratio which is ratio between respective intervals of these signal level pairs.

9. An information reproducing apparatus as set forth in claim 8, wherein the reference value output means outputs, as the reference value, the amplitude ratio when sum total of respective dispersion values of signal levels in the vicinity of the respective peaks of the signal level distribution is minimum.

10. An information reproducing apparatus as set forth in claim 8, wherein the reference value output means outputs, as the reference value, the amplitude ratio when jitter or error rate is minimum at the time of data detection of the reproduction signal.

11. An information reproducing apparatus as set forth in claim 5, wherein the reference value is set at the reference value output means at the time of disc loading of the optical disc or regularly (periodically).

12. An information reproducing apparatus as set forth in claim 3,
wherein the resolution detecting means detects data pattern from the reproduction signal to detect the resolution on the basis of signal level corresponding to the detected pattern.

13. An information reproducing apparatus as set forth in claim 12,
wherein the resolution detecting means detects, in accordance with data pattern detected from the reproduction signal, the resolution on the basis of ratio between level difference between data samples before and after zero cross point of the signal and amplitude of signal envelope.

14. An information reproducing apparatus as set forth in claim 12,
wherein the resolution detecting means detects, as the data pattern, data longer than the shortest mark of data or data of a specific mark length or more to detect the resolution from first level difference between data samples with change point of the signal being put, therebetween and second level difference between data samples except for the data samples between which the change point is put.

15. An information reproducing apparatus as set forth in claim 14,
wherein the resolution detecting means allows either one of the first level difference and ratio between the first level difference and the second level difference to be the resolution.

16. An information reproducing apparatus as set forth in claim 12,
wherein the reference value output means determines respective dispersions of signal levels in the vicinity of respective peaks every the peaks of distribution of signal levels of the reproduction signal to allow the amplitude ratio when sum total value of these dispersions is minimum to be the reference value.

17. An information reproducing apparatus as set forth in claim 3,
which farther comprises band-dividing means for dividing a signal of the resolution from the resolution detecting means into d.c. component, lower frequency component and higher frequency component, thus to control reproduction power by the light beams of the basis of the d.c. component and the lower frequency component from the band dividing means so that the resolution becomes close to the reference value, and to control equalize characteristic of the reproduction signal on the basis of the higher frequency component.

18. An information reproducing apparatus as set forth in claim 17,
wherein the resolution detecting means carries out statistical processing of data samples of the signal levels to detect resolution.

19. An information reproducing apparatus as forth in claim 17,
wherein the reproduction control means controls the reproduction power in a manner following temperature change in point of time of the optical disc and drift of reproduction power of the light beams so that the average resolution becomes close to the reference value with the reference value being as initial value.

20. An information reproducing apparatus as set forth in claim 17,
wherein gain of the equalize characteristic is adjusted so that change of the resolution is constant (fixed) to carry out control.

21. An information reproducing method for irradiating light beams with respect to a recording medium including a recording layer and a reproduction (readout) layer to open, at the reproduction layer, detection window smaller than irradiation range of light beams to thereby read out recording information of the recording layer, the method comprising:
a resolution detection step of detecting resolution on the basis of signal level of a reproduction signal reproduced from the recording medium;
a reference value output step of outputting reference value of the resolution; and
a reproduction control step of controlling size of the detection window so that the resolution becomes close to the reference value,
wherein, at the resolution detection step, a procedure is taken to detect the resolution from signal level distribution of the reproduction signal.

22. An information reproducing method as set forth in claim 21,
wherein, at the resolution detection step, a procedure is taken to carry out statistical processing of signal levels in the vicinity of respective peaks every the peaks of the signal level distribution to determine respective representative values to determine at least two pairs of signal levels substantially equal to each other in distance from d.c. level with change point of the signal of these representative values being put therebetween to detect the resolution on the basis of amplitude ratio which is ratio between respective intervals of these signal level pairs.

23. An information reproducing method as set forth in claim 21,
wherein, at the resolution detection step, a procedure is taken to detect data pattern from the reproduction signal to detect the resolution on the basis of signal level corresponding to the detected pattern.

24. An information reproducing method as set forth in claim 23,
wherein, at the resolution detection step, a procedure is taken to detect, in accordance with data pattern detected from the reproduction signal, the resolution on the basis of ratio between level difference between data samples before and after zero cross point of the signal and amplitude of signal envelope.

25. An information reproducing method as set forth in claim 21,
which further comprises:
a band division step of dividing the signal of the resolution obtained at the resolution detection step into d.c. component, lower frequency component and higher frequency component to control reproduction power by the light beams on the basis of the d.c. component and the lower frequency component obtained at the band division step so that tie resolution becomes close to the reference value, and to control equalize characteristic of the reproduction signal on the basis of the higher frequency component.

26. An information reproducing method as set forth in claim 25,
wherein, at the resolution detection step, a procedure is taken to carry out statistical processing of data samples of the signal levels to detect resolution.

* * * * *